United States Patent
Shinohara

(10) Patent No.: US 12,237,785 B2
(45) Date of Patent: Feb. 25, 2025

(54) ELECTRICAL POWER CONVERSION APPARATUS

(71) Applicant: Mitsubishi Electric Corporation, Tokyo (JP)

(72) Inventor: Ryo Shinohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 132 days.

(21) Appl. No.: 18/303,714

(22) Filed: Apr. 20, 2023

(65) Prior Publication Data

US 2023/0396198 A1    Dec. 7, 2023

(30) Foreign Application Priority Data

Jun. 1, 2022   (JP) ................... 2022-089371

(51) Int. Cl.
    *H02P 21/16*      (2016.01)
    *H02P 21/22*      (2016.01)
    *H02P 27/12*      (2006.01)

(52) U.S. Cl.
    CPC .............. *H02P 21/16* (2016.02); *H02P 21/22* (2016.02); *H02P 27/12* (2013.01)

(58) Field of Classification Search
    CPC ........... H02P 21/16; H02P 21/22; H02P 27/12
    See application file for complete search history.

(56) References Cited

U.S. PATENT DOCUMENTS

| | | | |
|---|---|---|---|
| 2012/0209467 A1* | 8/2012 | Kono | B60L 3/0023 701/22 |
| 2013/0147407 A1* | 6/2013 | Kawamura | H02P 29/68 374/102 |
| 2015/0211938 A1 | 7/2015 | Imakiire et al. | |
| 2020/0382003 A1 | 12/2020 | Sakamoto | |

FOREIGN PATENT DOCUMENTS

| | | |
|---|---|---|
| JP | 5880734 B2 | 3/2016 |
| JP | 6847158 B2 | 3/2021 |

* cited by examiner

*Primary Examiner* — Zoheb S Imtiaz
(74) *Attorney, Agent, or Firm* — Sughrue Mion, PLLC

(57) ABSTRACT

An electrical power conversion apparatus is provided in which a heat generation abnormality-state such as an abnormal state of a cooling device is determined earlier in its determination, so that it becomes possible to securely perform a protective operation even in the heat generation abnormality-state. A control device estimates a change rate of a temperature detection value on the basis of a switching-element loss calculation value of a semiconductor switching element(s) calculated at least based on an electric current detection value, and compares a temperature-detection change-rate calculation value calculated from a temperature detection value with a temperature-detection change-rate estimation value, so that a heat generation abnormality-state of the semiconductor switching element(s) is estimated.

21 Claims, 11 Drawing Sheets

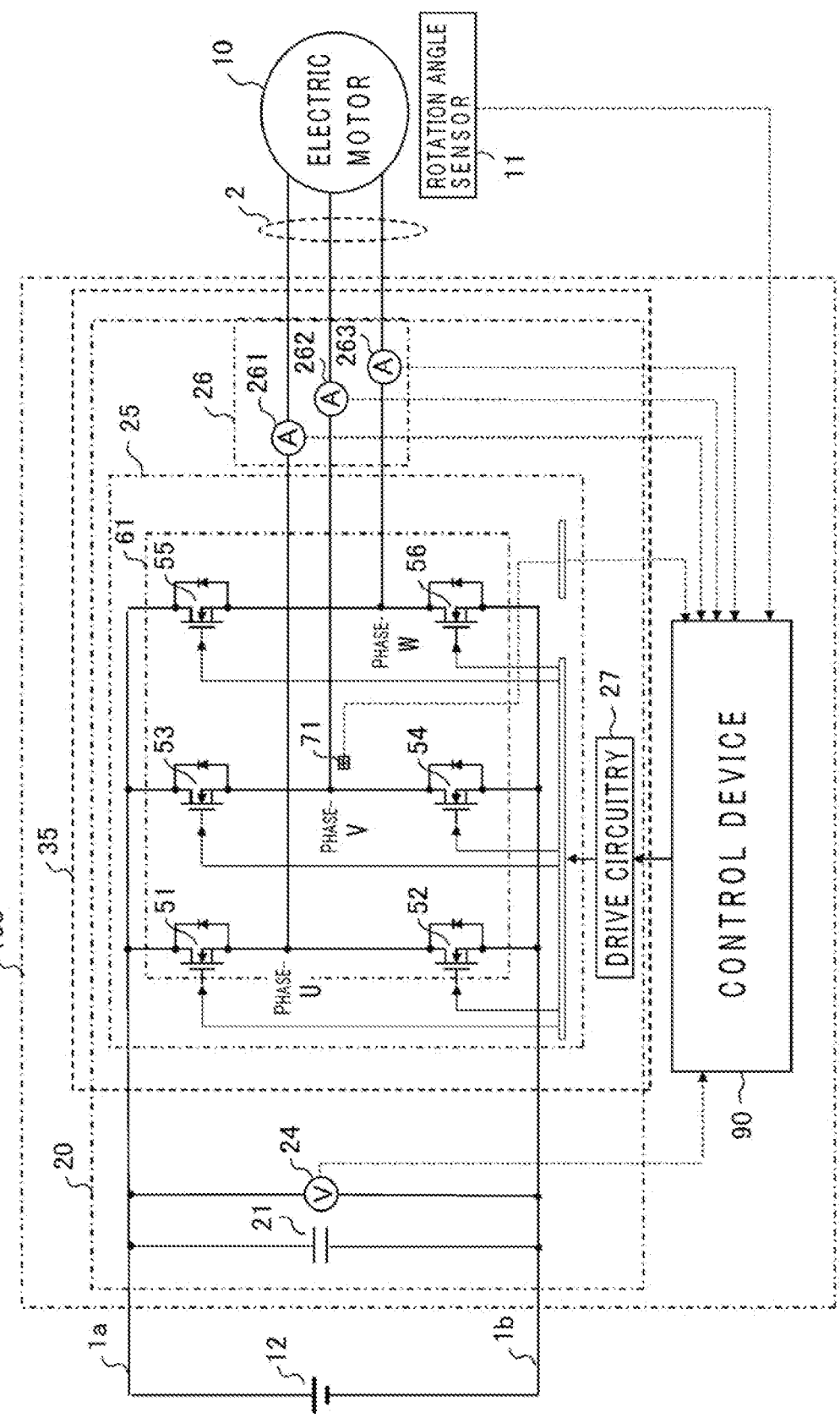

ELECTRICAL POWER CONVERSION APPARATUS

BACKGROUND OF THE INVENTION

Field of the Invention

The disclosure of the present application relates to an electrical power conversion apparatus.

Description of the Related Art

An electrical power conversion apparatus for use in an electric motor-operated vehicle is required to operate without getting faulty under various conditions, and also to continue the operations of an automotive vehicle at the time of abnormality in the electrical power conversion apparatus.

In a semiconductor switching element(s) of an electrical power conversion apparatus, an electric power loss(es) is caused in the switching operations, so that there exists a possibility to reach through to become faulty when a junction temperature(s) of the semiconductor switching element(s) exceeds a predetermine value. For this reason, it is necessary to provide the protection so that the junction temperature does not exceed a predetermine value; however, a junction is a bonded portion in a semiconductor chip, which is difficult to directly measure. In order to achieve this, a scheme is disclosed in which a temperature of the semiconductor switching element(s) is detected, and a junction temperature is estimated by using the temperature detection value and a loss calculated from the operations of the semiconductor switching element(s) (for example, Patent Document 1).

However, according to a scheme disclosed in Patent Document 1, a junction temperature is estimated from a correlation between a calculated loss and a temperature rise; however, their changes in a cooler state are not taken into consideration. Therefore, when the cooler state changes, there arises a problem in that the junction temperature cannot be accurately estimated, so that secure protection cannot be carried out.

In order to solve these problems, a scheme is disclosed in which a present-time temperature detection value is estimated by using a loss calculated from the operations of a semiconductor switching element(s) and a past-time temperature detection value, and a cooling device state is estimated by comparing the temperature-detection estimation value with the temperature detection value, so that an electric current flowing through the semiconductor switching element(s) is limited on the basis of the estimated cooling device state (Patent Document 2). In more detail, when the difference between a temperature-detection estimation value and a temperature detection value becomes larger than a threshold value, a cooling device abnormality-state is estimated.

[Patent Document 1] Japanese Patent Publication No. 5880734

[Patent Document 2] Japanese Patent Publication No. 6847158

According to a scheme disclosed in Patent Document 2, determination of an abnormal state of a cooling device is performed on the basis of the difference between a temperature-detection estimation value, being the value estimated by using a loss calculated from the operations of a semiconductor switching element(s) and by using a past-time temperature detection value, and a temperature detection value; however, when an abnormal state is erroneously determined in a case in which the cooling device is in a normal state, the operations become to act limiting an electric current to an excessive degree in spite of the fact being a state in which there exists no problem to allow the electric current flowing through the semiconductor switching element(s), so that desired operations are not achieved at the normal time; and so, it is necessary not to erroneously determine an abnormal state. For this reason, it is necessary to set a threshold value for performing the comparison with the difference between a temperature-detection estimation value and a temperature detection value by taking into consideration of a detection error of the temperature detection value and an estimation calculation error of the temperature-detection estimation value, so that the threshold value have to be set larger.

However, if a threshold value is set larger, the timing in which the difference between a temperature-detection estimation value and a temperature detection value becomes larger than the threshold value is then delayed in a case in which a cooling device is in an abnormal state, so that an abnormal state of the cooling device cannot be determined earlier in its determination. In an abnormal state of the cooling device, there exists the necessity to perform overheating or overheat protection at an early stage because a temperature of the semiconductor switching element(s) is in a state capable of taking on a rapid rise, and so, it is feared that secure protection cannot be carried out even with a scheme disclosed in Patent Document 2.

SUMMARY OF THE INVENTION

The present invention of the application concerned has been directed at disclosing technologies for solving those problems as described above, and an object of the disclosure is to provide an electrical power conversion apparatus in which a change rate of a temperature detection value is estimated from a loss calculated from the operations of a semiconductor switching element(s), and a generation abnormality-state such as an abnormal state of a cooling device is determined by comparing a temperature-detection change-rate calculated from the temperature detection value with the temperature-detection change-rate estimation value, whereby a heat generation abnormality-state is determined earlier in its determination, so that it becomes possible to securely perform a protective operation even in the heat generation abnormality-state.

In an electrical power conversion apparatus disclosed in the present disclosure of the application concerned, the electrical power conversion apparatus comprises: a semiconductor switching element(s) for converting electric power through the switching operations thereof; a cooling device(s) for cooling the semiconductor switching element(s); a control device for controlling the semiconductor switching element(s); a temperature detector(s) for detecting a temperature of the semiconductor switching element(s); an electric current detector for detecting an electric current flowing through the semiconductor switching element(s), wherein the control device comprises: a semiconductor-switching-element loss calculation unit for calculating a loss of the semiconductor switching element on the basis of at least an electric current detection value; a temperature-detection change-rate estimation-calculation unit for estimating a change rate of a temperature detection value obtained by the temperature detector(s), on the basis of a switching-element loss calculation value of the semiconductor-switching-element loss calculation unit; a temperature-detection change-rate calculation unit for calculating a temperature-detection change-rate from a temperature detection value obtained by the temperature detector(s); and a heat generation abnormality-state determination unit for estimating a heat generation abnormality-state of the semiconductor switching element by comparing the temperature-detection change-rate estimation value with the temperature-detection change-rate calculation value.

According to the electrical power conversion apparatus disclosed in the disclosure of the application concerned, an electrical power conversion apparatus can be obtained in which, in a heat generation abnormality-state such as abnormality or the like of a cooling device, the configuration is adopted to perform the comparison of an estimation value with a detection value in relation to a temperature change rate in which the difference is significantly caused in comparison with a normal heat generation state, whereby a heat generation abnormality-state is determined earlier in its determination, so that it becomes possible to securely perform a protective operation even in the heat generation abnormality-state.

BRIEF DESCRIPTION OF DRAWINGS

FIG. 12 is a block diagram illustrating a configuration of yet another modification example of the electrical power conversion apparatus according to Embodiment 1 or that of the electrical power conversion apparatus according to Embodiment 2.

DETAILED DESCRIPTION OF THE PREFERRED EMBODIMENTS

Embodiment 1

Figure 1:
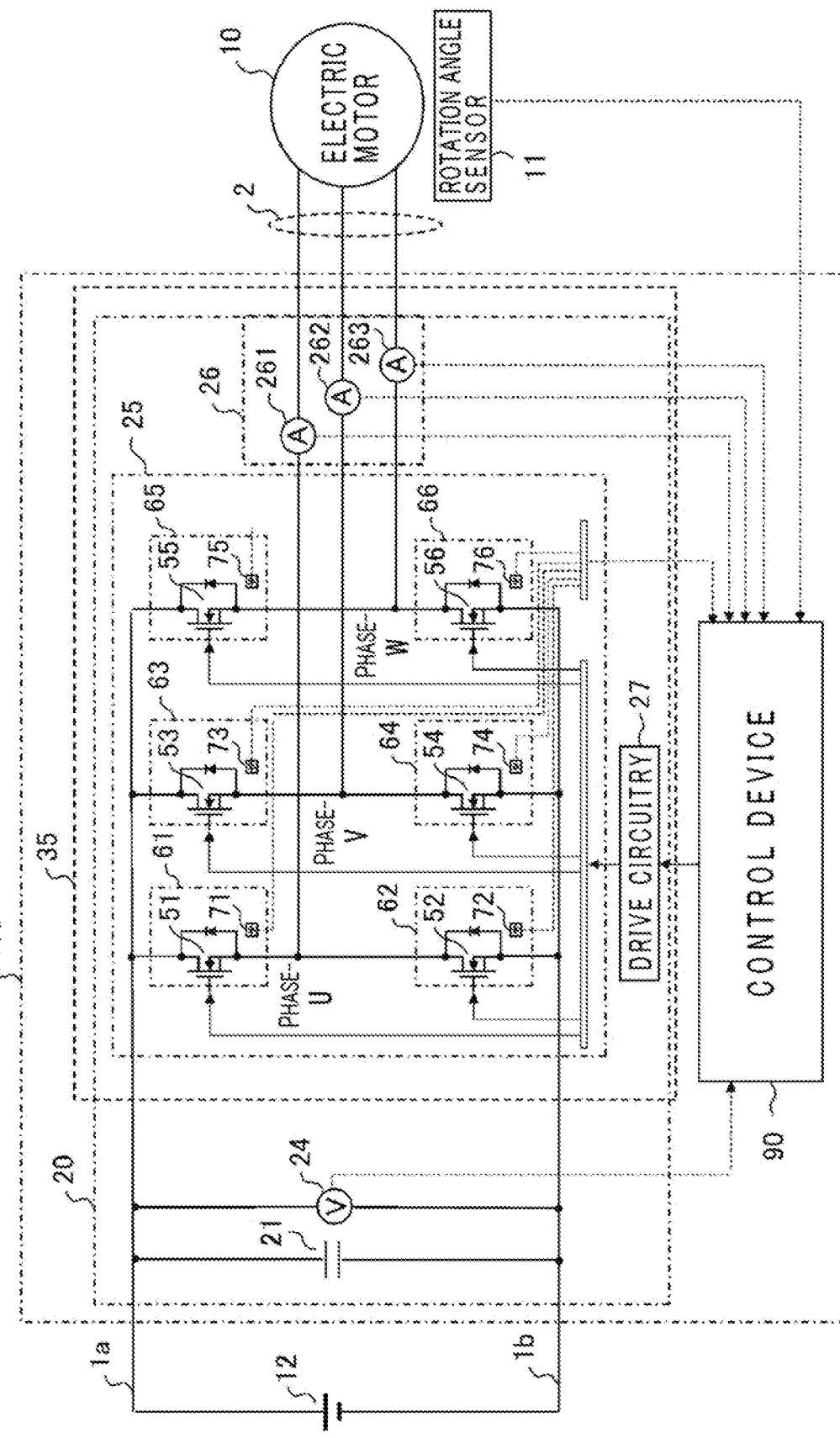
FIG. 1 is a block diagram illustrating a configuration of an electrical power conversion apparatus according to Embodiment 1.

Embodiment 1 relates to an electrical power conversion apparatus which comprises: a semiconductor switching element(s) for converting electric power; a cooling device for cooling the semiconductor switching element(s); a control device for controlling the semiconductor switching element(s); a temperature detector(s) for detecting a temperature of the semiconductor switching element(s); and an electric current detector for detecting an electric current flowing through the semiconductor switching element(s). And then, the control device of the electrical power conversion apparatus calculates a loss of the semiconductor switching element(s) on the basis of at least an electric current detection value; the control device estimates through calculation a change rate of a temperature detection value on the basis of the switching-element loss calculation value, and also calculates a temperature-detection change-rate from the temperature detection value; and the control device estimates a heat generation abnormality-state of the semiconductor switching element(s) by comparing the temperature-detection change-rate estimation value with the temperature-detection change-rate calculation value. In particular, Embodiment 1 relates to overheating or overheat protection of a semiconductor switching element(s) such as an insulated-gate bipolar transistor (IGBT), a metal-oxide semiconductor field-effect transistor (MOSFET) and/or the like in use for the electrical power conversion apparatus.

Hereinafter, the explanation will be made referring to the drawings for a configuration(s) and the operations of an electrical power conversion apparatus according to Embodiment 1.

<Configuration(s) of Electrical Power Conversion Apparatus>

First, the explanation will be made referring to FIG. 1 for a configuration of an electrical power conversion apparatus 100 of Embodiment 1.

As for the electrical power conversion apparatus 100 of Embodiment 1, an electrical power conversion apparatus is presumed which is used for an electric motor-operated vehicle such as an electric automotive vehicle, a plug-in hybrid automotive vehicle and the like, and which is in use for driving a motor acting as driving force by means of electric power of a high-voltage battery.

Note that, in FIG. 1, the diagram shows to include: a direct current (DC) power supply 12 of a battery or the like which supplies DC power into the electrical power conversion apparatus, and also, which is charged by regenerative electric power therefrom; and an electric motor 10 being a controlled object. Note that the controlled object is not necessarily limited to the electric motor 10, but it may be other than the electric motor 10.

In FIG. 1, the electrical power conversion apparatus 100 is connected to the DC power supply 12 by means of a DC busbar 1a on a positive electrode-side and a DC busbar 1b on a negative electrode-side, and supplies/receives drive power/regenerative power to/from the DC power supply 12. In addition, the electrical power conversion apparatus 100 is connected to the electric motor 10 by means of alternating current (AC) busbars 2, supplies/receives drive power/regenerative power to/from the electric motor 10.

In addition, on the electric motor 10, a rotation angle sensor 11 for detecting a rotation angle θm of the electric motor is mounted. Note that the electric motor 10 is an electric motor which rotationally drives a load, and also which is capable of regenerating rotational energy of the load as electrical energy. For example, a permanent magnet three-phase AC synchronous motor or a three-phase brushless motor is used for the electric motor.

The electrical power conversion apparatus 100 is constituted of an electric power conversion device 20, a control device 90 and a cooling device 35.

The electric power conversion device 20 comprises: a capacitor 21 connected across the positive electrode-side DC busbar 1a on a power supply's input side and the negative electrode-side DC busbar 1b thereon; a voltage detection device 24 for detecting a DC busbar voltage of the electric power conversion device 20; converter or inverter circuitry 25 constituted of a plurality of switching elements, for performing electric power conversion of direct current (DC) to alternating current (AC), or AC to DC; electric current detectors or an electric current detection unit 26 for detecting electric currents of the electric motor 10 flowing through the AC busbars 2; and drive circuitry 27 for performing drive controls to change over a turn-on of a switching element and a turn-off thereof.

The capacitor 21 has a function to suppress ripples of the DC busbar voltage, and/or a function to enhance alternating current (AC) drive ability of the electric power conversion device 20 by reducing a power supply impedance of the electric power conversion device 20, a function to absorb or to cancel out a surge voltage(s), and the like. In addition, the voltage detection device 24 divides a DC busbar voltage by means of a voltage divider resistor or the like so that the voltage can be read in by the control device 90, and outputs the DC busbar voltage information into the control device 90.

The inverter circuitry 25 is made of an inverter in which six switching elements are connected in a full-bridge configuration as generally well-known.

Namely, as illustrated in FIG. 1, switching elements 51 and 52, switching elements 53 and 54, and switching elements 55 and 56 are connected in series to each other so that the respective switching elements on the upper arm sides and switching elements on the lower arm sides are interconnected, and are connected in parallel with respect to the DC power supply 12.

In addition, the midpoint of the switching elements 51 and 52 is connected to a phase-U input of the electric motor the midpoint of the switching elements 53 and 54 is connected to a phase-V input of the electric motor 10; and the midpoint of the switching elements 55 and 56 is connected to a phase-W input of the electric motor 10.

In FIG. 1, the semiconductor switching elements 51, 52, 53, 54, 55 and 56 are built-in inside of semiconductor modules 61, 62, 63, 64, 65 and 66, respectively.

Each of the switching elements is a metal-oxide semiconductor field-effect transistor (Metal-Oxide Semiconductor Field-Effect Transistor, MOSFET) in which a diode is built-in between the supply and the drain as shown in FIG. 1, for example. Note that the kinds of the semiconductor switching elements and the number of them are not limited to those; for example, a semiconductor switching element made of an insulated-gate bipolar transistor (Insulated-Gate Bipolar Transistor, IGBT), a silicon carbide metal-oxide semiconductor field-effect transistor (SiC-MOSFET) and the like may also be used.

Moreover, in the inverter circuitry 25, temperature detectors 71, 72, 73, 74, 75 and 76 are placed inside of or in the vicinities of the semiconductor modules 61 through 66 for detecting the temperatures of the semiconductor switching elements 51 through 56, respectively. Temperature detection values detected by the temperature detectors 71 through 76 are inputted into the control device 90.

Note that, the temperature detectors 71 through 76 for detecting the temperatures of the semiconductor switching elements 51 through 56 may be placed inside of the semiconductor modules 61 through 66, or may also be placed on the board where the semiconductor modules 61 through 66 are mounted and in the vicinities of the semiconductor modules 61 through 66. As for the temperature detectors, thermistors are presumed. Note that, the temperature detectors are not limited to thermistors, and so, a configuration may be adopted in such a manner that, for example, the temperatures are detected by means of temperature detecting diodes which are arranged on a semiconductor board of the semiconductor switching elements 51 through 56.

The electric current detection unit 26 is constituted of a phase-U current detector 261, a phase-V current detector 262 and a phase-W current detector 263. The phase-U current detector 261, the phase-V current detector 262 and the phase-W current detector 263 are each made of by using shunt resistors, for example. The phase-U current detector 261 outputs a phase-U current detection value corresponding to a phase-U current Iu into the control device 90. The phase-✓ current detector 262 outputs a phase-V current detection value corresponding to a phase-V current Iv into the control device 90. The phase-W current detector 263 outputs a phase-W current detection value corresponding to a phase-W current Iw into the control device 90. Note that, in the following explanation, a phase-U current detection value, a phase-V current detection value and a phase-W current detection value may be referred to collectively as an electric current detection value. In addition, the electric current detection unit 26 may be made of electric current sensors using Hall effect elements or the like.

The drive circuitry 27 is controlled on the basis of pulse-width modulation (PWM) signals inputted from the control device 90. The drive circuitry 27 includes a function to change over turn-on and turn-off operations of switching elements 51 through 56.

The rotation angle sensor 11 is a sensor for detecting a rotor's rotation angle θm of the electric motor 10 by means of a resolver, an encoder and/or the like. A rotor's rotation angle θm detected by the rotation angle sensor 11 is outputted into the switching control device 90. Note that, the rotor's rotation angle θm is converted into an electrical angle θe on the basis of the number of pole pairs of the electric motor 10.

The cooling device 35 provides cooling for the semiconductor switching elements 51 through 56. The cooling device 35 is made of a water-cooled cooling device, for example. To be specific, the water-cooled cooling device, a radiator, an electric motor-operated water pump and the like are configured to connect by hoses to one another, so that a cooling medium of water, an oil, a long life coolant (Long Life Coolant, LLC) or the like is made to flowed into from the electric motor-operated water pump with respect to the water-cooled cooling device. Note that, the cooling device 35 is not limited to a water-cooled cooling device, but an air-cooled cooling device may also be used, for example.

The cooling device 35 may also be a heat sink which is connected to the switching elements 51 through 56 to perform conduction of heat.

<Hardware Configuration of Control Device>

Figure 2:
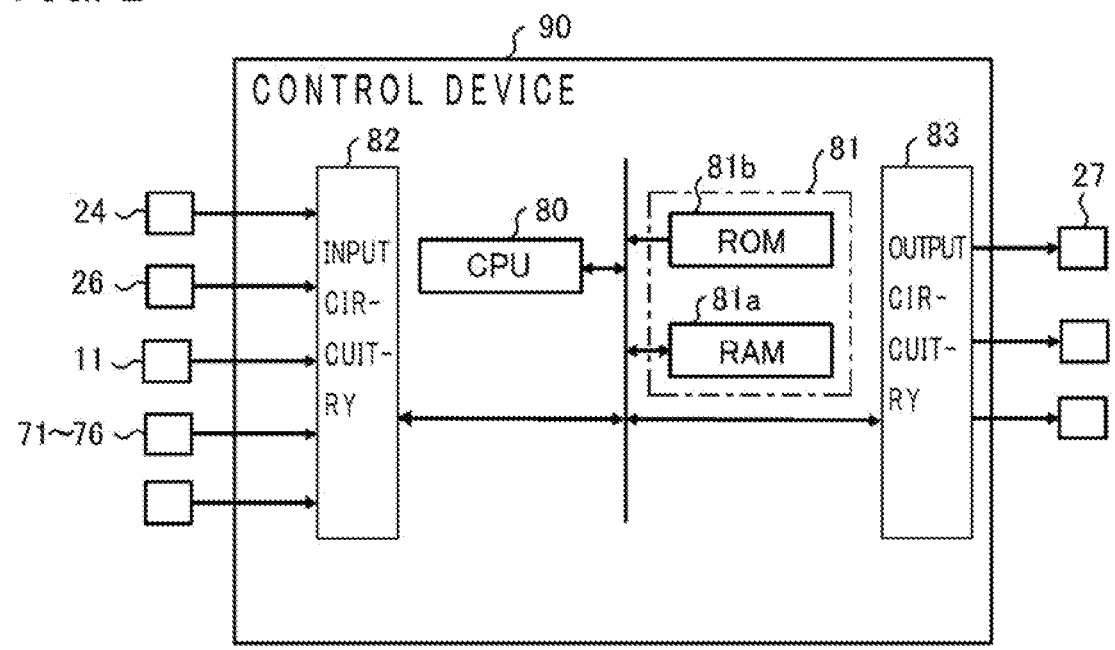
FIG. 2 is a hardware configuration diagram of a control device in the electrical power conversion apparatus according to Embodiment 1.

FIG. 2 is a diagram showing a hardware configuration of the control device 90 in the electrical power conversion apparatus 100 according to Embodiment 1. In the embodiment, the control device 90 is a control apparatus for controlling the electrical power conversion apparatus 100. Each of the functions in the control device 90 is achieved by means of a processing circuit where the control device 90 comprises. To be specific, the control device 90 comprises as the processing circuits, for example: a calculation processing device 80 (computer) as a central processing unit (Central Processing Unit, CPU); a memory or storage device 81 for exchanging data with the calculation processing device 80; input circuitry 82 for inputting external signals into the calculation processing device 80; output circuitry 83 for externally outputting signals from the calculation processing device 80; and the like.

As for the calculation processing device 80, it may include such as an application specific integrated circuit (Application Specific Integrated Circuit, ASIC), integrated circuits (Integrated Circuits, ICs), a digital signal processor (Digital Signal Processor, DSP), a field-programmable gate array (Field Programmable Gate Array, FPGA), various kinds of logic circuits, various kinds of signal processing circuits, and the like. In addition, as for the calculation processing device 80, it may be so arranged that the same kinds of calculation processing devices or different kinds of calculation processing devices are provided in a plurality of calculation processing devices, and that each process may be executed by sharing the processing. As for the storage device 81, included are: a random access read-write memory (Random Access Memory, RAM) (volatile main storage device 81*a*) which is configured so that data can be read out into the calculation processing device 80, and data can be written into therefrom; a random access read-only memory (Read-only Memory, ROM) (nonvolatile auxiliary storage device 81*b*) which is configured so that data can be read out into the calculation processing device 80; and the like. The input circuitry 82 including the rotation angle sensor 11, the voltage detection device 24, the electric current detection unit 26 and the temperature detectors 71 through 76 includes interface circuits such as AD conversion units to which various kinds of sensors and switches are connected so that output signals of these sensors and switches are inputted into the calculation processing device 80, input circuits and the like. The output circuitry 83 including the drive circuitry 27 includes interface circuits such as drive circuits to which electrical loads of switching devices, actuators and the like are connected so that output signals from the calculation processing device 80 are converted and outputted into these electrical loads, communications circuits and the like.

Each of the functions where the control device 90 comprises is achieved in such a manner that: the calculation processing device 80 executes software (programs) stored in the auxiliary storage device 81*b*, and the calculation processing device operates in collaboration with other pieces of hardware of the control device 90 such as the storage device 81, the input circuitry 82, the output circuitry 83 and the like. Note that, setting data such as a threshold value(s), a determination value(s) and the like where the control device 90 uses is stored in the auxiliary storage device 81*b* as a portion of the software (programs).

Each of the functions installed inside of the control device 90 may be a function which is configured by respective modules of software; however, the function may be configured by means of a combination of software and hardware.

<Functional Blocks of Control Device>

Figure 3:
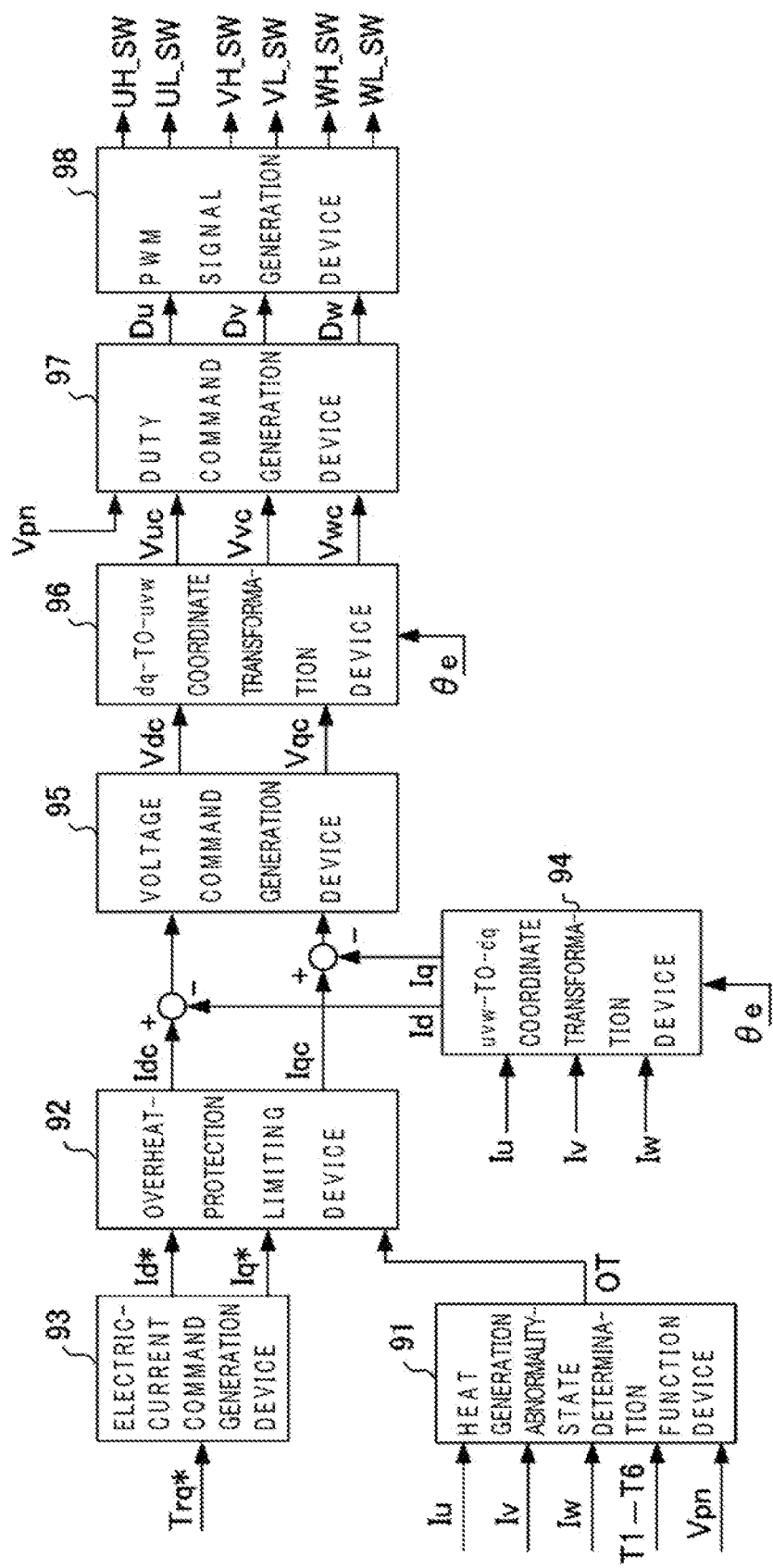
FIG. 3 is a functional block diagram of the control device in the electrical power conversion apparatus according to Embodiment 1.

FIG. 3 is a diagram showing functional blocks of the control device 90 in the electrical power conversion apparatus 100 according to Embodiment 1. In FIG. 3, the control device 90 comprises a heat generation abnormality-state determination function device 91, an overheat-protection limiting device 92, an electric-current command generation device 93, a uvw-to-dq coordinate transformation device (also referred to as "coordinate transformation (uvw to qd) device") 94, a voltage command generation device 95, a dq-to-uvw coordinate transformation device (also referred to as "coordinate transformation (dq to uvw) device") 96, a duty transformation or duty command generation device 97, and a PWM signal generation device 98.

Into the electric-current command generation device 93, a torque command value Trq* is inputted from an upper-level system (not shown in the figures). Note that, as control commands for controlling the electric motor 10, a torque command, an electric current command, a voltage command and the like can be named, for example. In Embodiment 1, a torque command value Trq* is exemplarily utilized in the case as a control command. The electric-current command generation device 93 produces a d-axis current command value Id* and a q-axis current command value Iq* on the basis of the torque command value Trq*.

Here, the d-axis indicates a magnetic pole position of the electric motor 10, namely, the direction of magnetic flux, and the q-axis indicates a direction electrically perpendicular to the d-axis, so that a d-axis and q-axis coordinate system is established. The d-axis and q-axis coordinate system is of a rotational coordinate system, so that the d-axis and q-axis coordinate system also rotates accordingly when the rotor of the electric motor 10 having magnets rotates.

The heat generation abnormality-state determination function device 91 includes a function being a feature of the present invention of the application concerned in which a loss of the semiconductor switching elements is calculated on the basis of at least an electric current detection value, and a change rate of a temperature detection value is estimated through calculation on the basis of the switching-element loss calculation value, and also in which a temperature-detection change-rate is calculated from the temperature detection value, so that a heat generation abnormality-state of the semiconductor switching elements is estimated by comparing the temperature-detection change-rate estimation value with the temperature-detection change-rate calculation value.

Into the heat generation abnormality-state determination function device 91, electric current detection values Iu, Iv and Iw are inputted from the electric current detection unit 26; temperature detection values T1 through T6 are inputted from the temperature detectors 71 through 76; and a voltage detection value Vpn is inputted from the voltage detection device 24. On the basis of these pieces of information, the heat generation abnormality-state determination function device 91 estimates a heat generation abnormality-state of the semiconductor switching elements, and performs an output as a heat generation abnormality-state determination result OT into the overheat-protection limiting device 92. Here, the electric current detection values of the electric current detection unit 26 are constituted of a phase-U current detection value corresponding to a phase-U current Iu detected by the phase-U current detector 261, a phase-V current detection value corresponding to a phase-V current Iv detected by the phase-✓ current detector 262, and a phase-W current detection value corresponding to a phase-W current Iw detected by the phase-W current detector 263. As for a more detailed configuration of the heat generation abnormality-state determination function device 91, the explanation will be made later.

The overheat-protection limiting device 92 includes a function being a feature of the present invention of the application concerned in which, on the basis of a determination result of a heat generation abnormality-state, an action of a switching element(s) is limited so that its electric current is restricted. Into the overheat-protection limiting device 92, a d-axis current command value Id* and a q-axis current command value Iq*, and a heat generation abnormality-state determination result OT are inputted. When the heat generation abnormality-state determination result OT is in a heat generation abnormality-state, the overheat-protection limiting device 92 limits the d-axis current command value Id* and the q-axis current command value Iq* both being inputted to predetermined electric current command values, and then generates a d-axis current command value Idc and a q-axis current command value Iqc, respectively. When the heat generation abnormality-state determination result is in a heat generation normality-state, the overheat-protection limiting device 92 generates the d-axis current command value Id* and the q-axis current command value Iq* both being inputted as the d-axis current command value Idc and the q-axis current command value Iqc, respectively.

The uvw-to-dq coordinate transformation device 94 calculates a d-axis current detection value Id and a q-axis current detection value Iq from electric current detection values of the electric current detection unit 26 and from an angle detection value corresponding to an electrical angle θe detected by the rotation angle sensor 11. Here, the electric current detection values of the electric current detection unit 26 are constituted of a phase-U current detection value corresponding to a phase-U current Iu detected by the phase-U current detector 261, a phase-V current detection value corresponding to a phase-V current Iv detected by the phase-V current detector 262, and a phase-W current detection value corresponding to a phase-W current Iw detected by the phase-W current detector 263.

The voltage command generation device 95 calculates a d-axis voltage command Vdc and a q-axis voltage command Vqc by performing electric current feedback calculations from a d-axis current command Idc and a q-axis current command Iqc and from a d-axis current detection value Id and a q-axis current detection value Iq, respectively. To be specific, for example, the voltage command generation device 95 is configured to calculate the d-axis voltage command Vdc and the q-axis voltage command Vqc so that an electric current deviation ΔId being the deviation between the d-axis current command Idc and the d-axis current detection value Id, and also an electric current deviation ΔIq being the deviation between the q-axis current command Iqc and the q-axis current detection value Iq are each to converge to "zero." (Symbols ΔId and ΔIq are not shown in the figure.)

The dq-to-uvw coordinate transformation device 96 calculates three-phase voltage commands Vuc, Vvc and Vwc from a d-axis voltage command Vdc and a q-axis voltage command Vqc acquired from the voltage command generation device 95, and from an electrical angle θe acquired from the rotation angle sensor 11. Note that, it is preferable that the three-phase voltage commands Vuc, Vvc and Vwc are set so that they are not more than a DC power supply voltage being inputted into the electric power conversion device 20, namely, a voltage detection value Vpn detected by the voltage detection device 24, or an input voltage Vpn.

The duty command generation device 97 produces duty commands Du, Dv and Dw of three phases for each phase, from the three-phase voltage commands Vuc, Vvc and Vwc acquired from the dq-to-uvw coordinate transformation device 96, and from the input voltage Vpn. The duty command generation device 97 produces the duty commands Du, Dv and Dw corresponding to optimal correction control commands, and outputs them.

The PWM signal generation device 98 produces PWM signals. The PWM signal generation device 98 produces the PWM signals for performing a changeover control of turn-on and turn-off on the respective switching elements 51 through 56 from the duty commands Du, Dv and Dw of each phase acquired from the duty command generation device 97.

To be specific, the PWM signal generation device 98 produces the PWM signals by comparing the duty commands Du, Dv and Dw of each phase with a carrier wave. The PWM signal generation device 98 is configured so that the PWM signal generation device produces the PWM signals by utilizing a triangular waveform comparison scheme, a sawtooth waveform comparison scheme or the like in which triangular waves having the shapes of isosceles triangles whose ascending speeds and descending speeds are mutually identical are defined as a carrier, for example.

Note that, in FIG. 3, indicated as respective PWM signals produced by means of the PWM signal generation device 98 are: a PWM signal UH SW given to the switching element 51 of phase-U upper-arm; a PWM signal VH SW given to the switching element 53 of phase-V upper-arm; a PWM signal WH SW given to the switching element 55 of phase-W upper-arm; a PWM signal UL SW given to the switching element 52 of phase-U lower-arm; a PWM signal VL SW given to the switching element 54 of phase-V lower-arm; and a PWM signal WL SW given to the switching element 56 of phase-W lower-arm.

The PWM signals generated by means of the PWM signal generation device 98 are inputted from the control device 90 into the drive circuitry 27 of the electric power conversion device 20. By means of the drive circuitry 27, the turn-on and turn-off operations of the switching elements 51 through 56 are performed on the basis of the PWM signals, whereby DC power is converted into AC power so as to be supplied to the electric motor 10, and also, regenerative electric power generated when the electric motor 10 is in its regenerative state is charged into the DC power supply 12.

Here, a point of a feature of the electrical power conversion apparatus according to Embodiment 1 resides in a point in which: the heat generation abnormality-state determination function device 91 and the overheat-protection limiting device 92 are provided in the control device 90; and, when determination of a heat generation abnormality-state is performed in the heat generation abnormality-state determination function device 91, a d-axis current command value and a q-axis current command value are limited to predetermined electric current command values in the overheat-protection limiting device 92.

In addition, a point of a feature of the electrical power conversion apparatus according to Embodiment 1 resides in a point in which: the heat generation abnormality-state determination function device 91 calculates a loss of the semiconductor switching elements on the basis of at least an electric current detection value; the heat generation abnormality-state determination function device estimates through calculation a change rate of a temperature detection value on the basis of the switching-element loss calculation value, and also calculates a temperature-detection change-rate from the temperature detection value; and the heat generation abnormality-state determination function device estimates a heat generation abnormality-state of the semiconductor switching elements by comparing the temperature-detection change-rate estimation value with the temperature-detection change-rate calculation value.

Hereinafter, the explanation will be made in detail for the operations of the heat generation abnormality-state determination function device 91 and those of the overheat-protection limiting device 92 which are the features of the electrical power conversion apparatus according to Embodiment 1.

<Functional Blocks of Heat Generation Abnormality-state Determination Function Device>

Figure 4:
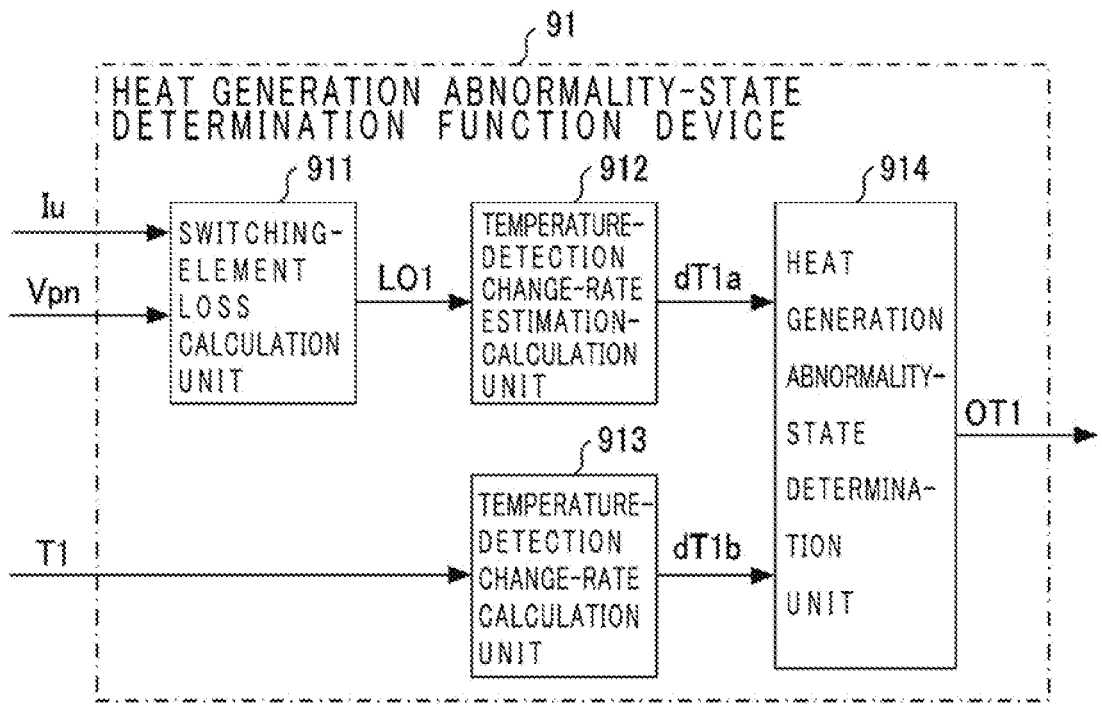
FIG. 4 is a functional block diagram of a heat generation abnormality-state determination function device of the control device in the electrical power conversion apparatus according to Embodiment 1.

FIG. 4 is a diagram showing functional blocks of a heat generation abnormality-state determination function device 91 of the control device 90 in the electrical power conversion apparatus 100 according to Embodiment 1. In FIG. 4, the heat generation abnormality-state determination function device 91 is constituted of a switching-element loss calculation unit 911, a temperature-detection change-rate estimation-calculation unit 912, a temperature-detection change-rate calculation unit 913 and a heat generation abnormality-state determination unit 914.

Note that, in FIG. 4, heat generation abnormality-state determination functions related to the switching element 51 at phase-U upper arm are representatively shown in the figure, and so, the description of heat generation abnormality-state determination functions related to the other switching elements 52 through 56 will be omitted for brevity of explanation. Also in the following explanation, the heat generation abnormality-state determination functions related to the switching element 51 at phase-U upper arm are representatively described. In relation to the other switching elements 52 through 56, their heat generation abnormality-state determination functions can also be similarly configured.

The switching-element loss calculation unit 911 calculates, by defining as its inputs an electric current detection value Iu from the electric current detection unit 26 and an input voltage Vpn from the voltage detection device 24, a loss of the semiconductor switching element 51, and outputs a semiconductor-switching-element loss calculation value LO1.

To be specific, the switching-element loss calculation unit 911 holds loss characteristics of a switching element(s) and those of a feedback diode(s) in advance, and calculates, by using these, as a semiconductor-switching-element loss calculation value LO1 a total sum of a conduction loss and a switching loss which are calculated for the respective switching element(s) and feedback diode(s).

In more detail, a conduction loss of the switching element(s) and that of the feedback diode(s) can be calculated in accordance with an electric current value flowing through the switching element(s) and with an electric current conduction time. An electric current flowing through each of the switching elements is calculated from an electric current detection value Iu, for example. The electric current conduction time of each switching element is calculated in accordance with the time of dead time which is set in advance so that the switching elements on the high potential side and the switching elements on the low potential side do not simultaneously turn on, and with a switching frequency. Note that, the switching frequency is the same as a frequency of PWM signals produced by the PWM signal generation device 98 for producing turn-on/turn-off signals into the switching elements, so that the frequency of PWM signals being set by the PWM signal generation device 98 is stored and used as the switching frequency.

Switching losses of the switching elements and those of the feedback diodes can be calculated in accordance with an electric current flowing through each of the switching elements, with a voltage applied across each of the switching elements and with the number of turn-on/turn-off switching operations. The electric current flowing through each of the switching elements is calculated from an electric current detection value Iu, for example. The voltage applied to each of the switching elements is calculated from an input voltage Vpn. The number of turn-on/turn-off switching operations is calculated by the switching frequency.

The calculation of a semiconductor-switching-element loss calculation value LO1 performed by the switching-element loss calculation unit 911 may be carried out by using all pieces of information related to a semiconductor-switching-element loss described above, or may also be carried out by using the information at the irreducible minimum with the requirement. For example, if a switching frequency and/or dead time are fixed, or if their variations are small to a slight extent, it is possible to calculate a semiconductor-switching-element loss in accordance with only an electric current detection value and with only an input voltage. In addition, if a system can be regarded that its input voltage is also fixed or that its variations are small to a slight extent, it is also possible to calculate a semiconductor-switching-element loss in accordance with only an electric current detection value.

Figure 5:
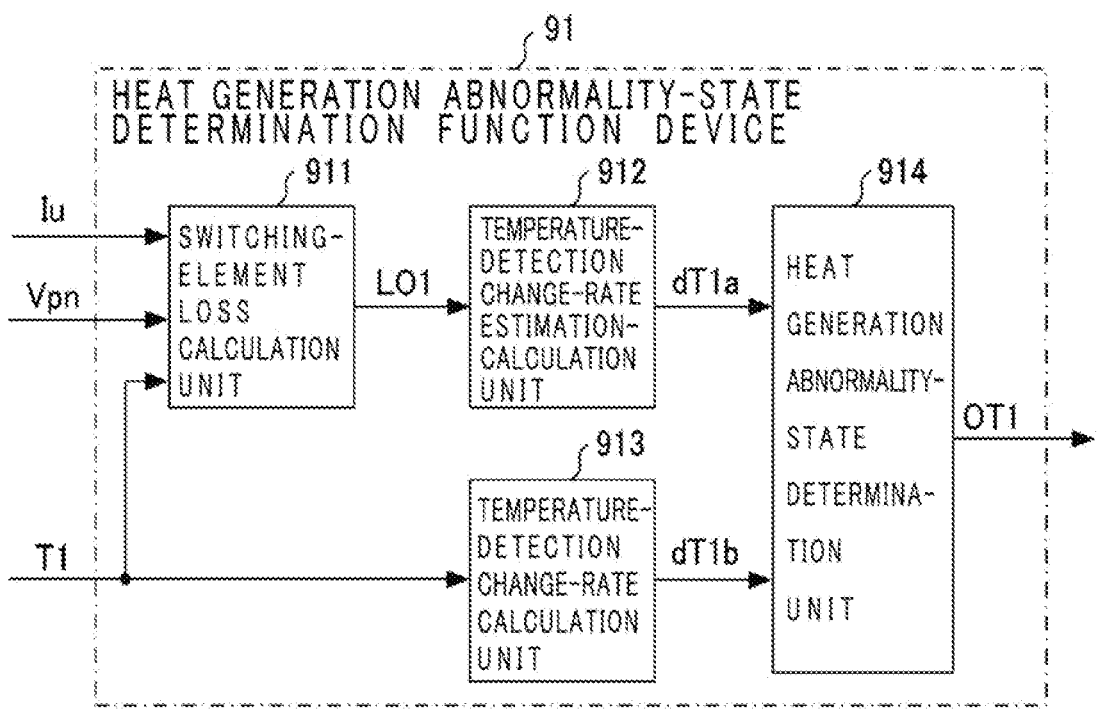
FIG. 5 is a functional block diagram showing a modification example of the heat generation abnormality-state determination function device of the control device in the electrical power conversion apparatus according to Embodiment 1.

Moreover, conduction losses and switching losses of the switching elements and those of the feedback diodes possess temperature dependency owing to the characteristic changes due to the temperatures of the switching elements. For this reason, the configuration may be adopted as a modification example shown in FIG. 5 in which a temperature detection value(s) is further inputted into the switching-element loss calculation unit 911 as its input, and the configuration may be adopted so that a semiconductor-switching-element loss is calculated by incorporating the characteristic changes due to the temperatures of the switching elements on the basis of a temperature detection value Ta, for example. According to this arrangement, the semiconductor-switching-element loss can be more accurately calculated. In addition, in such a configuration of FIG. 4 described above, namely, in the configuration in which temperature detection value information is not inputted into the switching-element loss calculation unit 911, it is preferable that the semiconductor-switching-element loss is calculated by using the characteristics of a switching element under a temperature condition in which the semiconductor-switching-element loss becomes the highest.

The temperature-detection change-rate estimation-calculation unit 912 estimates through calculation, by defining as its input a semiconductor-switching-element loss calculation value LO1 from the switching-element loss calculation unit 911, a temperature-detection change-rate being a change rate of a temperature detection value T1 of temperature detector 71 per unit time, and outputs a temperature-detection change-rate estimation value dT1a. (Hereinafter, a change rate of a temperature detection value per unit time is referred to as a "temperature-detection change-rate" for the sake of simplicity of the explanation.)

Here, for ease of understanding a calculation method of a temperature-detection change-rate of a temperature detector from a semiconductor-switching-element loss, the explanation will be made referring to FIG. 6 for the relationship between the semiconductor-switching-element loss and a temperature rise of a temperature detector in conjunction with a cooling effect of a cooling device.

Figure 6:
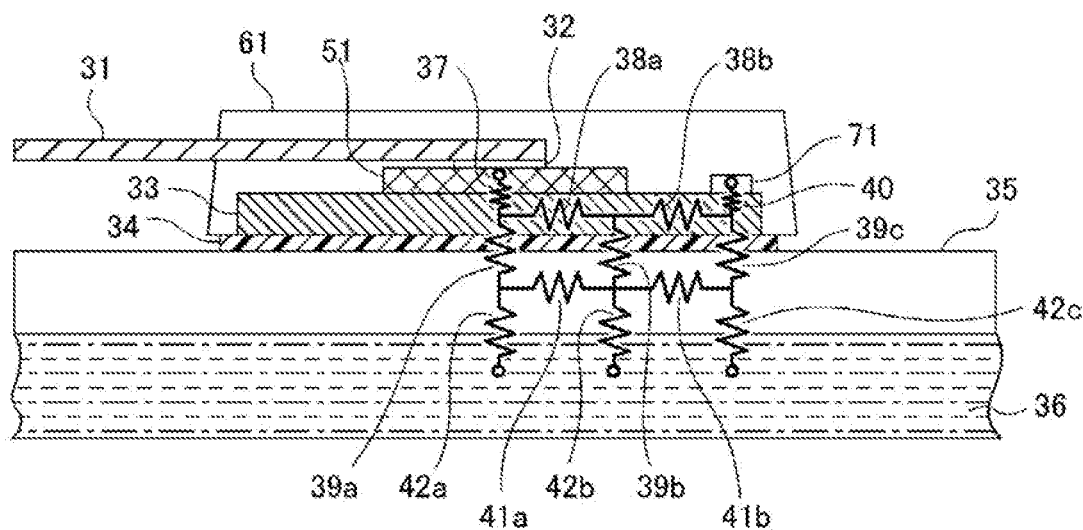
FIG. 6 is a diagram illustrating thermal circuitry of heat transfer paths from a semiconductor switching element into a temperature detector in the electrical power conversion apparatus according to Embodiment 1.

FIG. 6 is a diagram illustrating a thermal network or circuitry with a semiconductor switching element, a temperature detector and the cooling device 35, in an example of an electrical power conversion apparatus using the cooling device 35. Note that, as for the cooling device 35, a water-cooled cooling device is presumed.

The explanation will be made referring to FIG. 6 for each of the constituent elements which form a cooling device's thermal circuitry.

The semiconductor module 61 is constituted of the semiconductor switching element 51, a busbar 31, solder 32, a board 33 and the temperature detector 71.

Upon the board 33, the semiconductor switching element 51 and the temperature detector 71 are mounted, and the busbar 31 is connected to the semiconductor switching element 51 through the solder 32 upon the semiconductor switching element.

In addition, the semiconductor module 61 is bonded with the cooling device 35 through a dielectric member 34, and the cooling device 35 is cooled by means of a cooling water 36.

The temperature detector 71 is placed for the purpose of detecting a junction temperature of the semiconductor switching element 51; however, the temperature detector cannot be placed directly at a junction portion because of the structure, so that the temperature detector is placed in the vicinity of the semiconductor switching element 51 as shown in FIG. 6.

Next, the explanation will be made for the thermal resistance configuring thermal circuitry.

The thermal resistance configuring direct heat transfer paths from a junction portion of the semiconductor switching element 51 into the temperature detector 71 is defined as thermal resistances 37, 38a, 38b and 40.

The thermal resistance of heat transfer paths by way of the cooling device 35 is defined as thermal resistances 39a, 39b, 39c, 41a and 41b.

In addition, the thermal resistance of heat dissipation paths into the cooling water 36 is defined as thermal resistances 42a, 42b and 42c.

Here, when a cooling device state of the cooling device 35 is normal, a temperature rise is determined by means of the thermal circuitry of FIG. 6 in accordance with a loss where the semiconductor switching element 51 produces, by defining a temperature of the cooling water 36 as a reference.

Therefore, a junction temperature of the semiconductor switching element 51, a temperature detection value of the temperature detector 71 and a temperature of the cooling water 36 are uniquely determined.

Namely, when the thermal circuitry of FIG. 6 is known in advance, it is possible to calculate, from a loss of the semiconductor switching element 51, a temperature rise of a detection temperature at the temperature detector 71 in which a temperature of the cooling water 36 is defined as a reference.

Next, the explanation will be made for changes of the correlation between the thermal resistance and a temperature rise, and/or the correlation between an electrical loss and the temperature rise due to a change(s) of a cooling device state.

As an example of an abnormal state of the cooling device 35, consideration is given to a case in which the leakage of cooling water occurs. When the leakage of cooling water occurs, the cooling water 36 is flowed out, so that the heat dissipation paths into the cooling water 36 are lost. In this case, the thermal resistances 42a through 42c in the thermal circuitry of FIG. 6 disappear.

In FIG. 6, though the thermal circuitry is described by the thermal resistance only for brevity of explanation, the thermal circuitry includes thermal capacitance in parallel with the thermal resistance under actual circumstances. A junction temperature of the semiconductor switching element 51 and a detection temperature of the temperature detector 71 demonstrate a transient temperature transition in which the thermal capacitance is predominant, when a temperature distribution in which the cooling water 36 is lost is defined as an initial state.

Namely, in a cooling abnormality state in such a case that the leakage of cooling water of the cooling device 35 occurs, the thermal circuitry changes. For this reason, a temperature rise of a detection temperature of the temperature detector 71 having been estimated from a loss of the semiconductor switching element 51 on the basis of the thermal circuitry of FIG. 6 deviates from a temperature rise of an actual detection temperature.

As described above, when the thermal circuitry of FIG. 6 is known in advance, it is possible to calculate, from a loss of the semiconductor switching element 51, a temperature rise of a detection temperature of the temperature detector 71 in which a temperature of the cooling water 36 is defined as a reference.

In conformance with the principles described above, the temperature-detection change-rate estimation-calculation unit 912 estimates through calculation a temperature-detection change-rate estimation value $dT1a$ of the temperature detector 71 on the basis of a semiconductor-switching-element loss calculation value LO1 inputted from the switching-element loss calculation unit 911.

In more detail, in the temperature-detection change-rate estimation-calculation unit 912, thermal circuitry of heat transfer paths from the semiconductor switching element 51 into the temperature detector 71 is stored as shown in FIG. 6 in advance; and, on the basis of the thermal circuitry and on that of the loss LO1 of the semiconductor switching element 51, the temperature-detection change-rate estimation-calculation unit calculates a temperature rise quantity $\Delta T1$ of a detection temperature of the temperature detector 71, by defining a temperature of the cooling water 36 as a reference. Note that, as for the calculation of the temperature rise quantity $\Delta T1$ on the basis of the thermal circuitry and on that of the loss LO1 of the semiconductor switching element 51, the calculation is carried out by also using a temperature rise quantity $\Delta T1old$ of a detection temperature having been calculated in previous time.

And then, the temperature-detection change-rate estimation-calculation unit 912 calculates a change rate of the temperature rise quantity $\Delta T1$ per unit time on the basis of a temperature rise quantity $\Delta T1$ of a detection temperature being calculated, so that the temperature-detection change-rate estimation-calculation unit 912 outputs a calculation result as a temperature-detection change-rate estimation value $dT1a$. Note that, as described above, the temperature-detection change-rate estimation value $dT1a$ is calculated by using the temperature rise quantity $\Delta T1$ of a detection temperature of the temperature detector 71 calculated on the basis of thermal circuitry stored in advance and on that of a loss LO1 of the semiconductor switching element 51, and thus, temperature information of the cooling water 36 itself is not necessary for the calculation.

The temperature-detection change-rate calculation unit 913 calculates, by defining as its input a temperature detection value T1 from the temperature detector 71, a temperature-detection change-rate being a change rate of the temperature detection value T1 per unit time, and outputs a calculation result as a temperature-detection change-rate calculation value dT1$b$.

The heat generation abnormality-state determination unit 914 detects, by defining as its inputs the temperature-detection change-rate estimation value dT1$a$ and the temperature-detection change-rate calculation value dT1$b$, abnormal heat generation in which heat dissipation or generation of the switching element 51 becomes to an extent excessively large, and/or a cooling abnormality state or the like in which cooling performance of the cooling device 35 is lowered, and outputs the determination result as a heat generation abnormality-state determination result OT1.

To be specific, the heat generation abnormality-state determination unit 914 compares the temperature-detection change-rate estimation value dT1$a$ with the temperature-detection change-rate calculation value dT1$b$. As a result of the comparison, a heat generation abnormality-state determination result OT1 is determined as a heat generation abnormality-state, when the temperature-detection change-rate calculation value dT1$b$ is larger than the temperature-detection change-rate estimation value dT1$a$. According to this arrangement, it becomes possible to detect that a rise rate of an actual temperature detection value is larger than a rise rate of a temperature detection value presumed at a time of a normal state, so that it becomes possible to determine a heat generation abnormality-state by detecting abnormal heat generation in which heat dissipation or generation of a switching element(s) becomes to an extent excessively large, and/or a cooling abnormality state in which cooling performance of the cooling device 35 is lowered.

Note that, in a state in which a semiconductor switching loss is not caused or a state in which the semiconductor switching loss is small to a slight extent, the temperature-detection change-rate estimation value dT1$a$ and the temperature-detection change-rate calculation value dT1$b$ take on in vicinity of zero in a normal state and also in an abnormal state. In such a case, when determination of a heat generation abnormality-state is performed by comparing the temperature-detection change-rate estimation value dT1$a$ with the temperature-detection change-rate calculation value dT1$b$, it is feared that the determination might be erroneously made as a heat generation abnormality-state at a time in a normal state. For this reason, in the comparison of the temperature-detection change-rate estimation value dT1$a$ with the temperature-detection change-rate calculation value dT1$b$, a predetermined lower limitation value of zero or more may be set at the temperature-detection change-rate estimation value dT1$a$. According to this arrangement, because the temperature-detection change-rate estimation value dT1$a$ can be set at a predetermined lower limitation value larger than zero, the temperature-detection change-rate calculation value dT1$b$ being in vicinity of zero does not take on to become larger than the temperature-detection change-rate estimation value dT1$a$ in a state in which a semiconductor switching loss is not caused or a state in which the semiconductor switching loss is small to a slight extent, so that it becomes possible to prevent erroneously determining a heat generation abnormality-state in spite of the fact being in a normal state.

In addition, in the comparison of a temperature-detection change-rate estimation value dT1$a$ with a temperature-detection change-rate calculation value dT1$b$, it may be so arranged that a heat generation abnormality-state determination result OT1 is determined as a heat generation abnormality-state, when the temperature-detection change-rate calculation value dT1$b$ is larger than the temperature-detection change-rate estimation value dT1$a$ by a predetermined value or more. According to this arrangement, by setting the predetermined value in considerations with a calculation error of the temperature-detection change-rate calculation value dT1$b$ and/or with an estimation error of the temperature-detection change-rate estimation value dT1$a$, it becomes possible to more reliably prevent erroneously determining a heat generation abnormality-state at a time in a normal state.

<Operations of Overheat-protection Limiting Device 92>

The overheat-protection limiting device 92 includes a function to limit, on the basis of a determination result of a heat generation abnormality-state, an action of a switching element(s) so that its electric current is restricted. Into the overheat-protection limiting device 92, a d-axis current command value Id* and a q-axis current command value Iq* are inputted from the electric-current command generation device 93, and a heat generation abnormality-state determination result OT is inputted from the heat generation abnormality-state determination function device 91.

When a heat generation abnormality-state determination result OT is in a heat generation abnormality-state, the overheat-protection limiting device 92 limits a d-axis current command value Id* and a q-axis current command value Iq* to predetermined electric current command values, and generates a d-axis current command value Idc and a q-axis current command value Iqc, which are outputted into the voltage command generation device 95.

When a heat generation abnormality-state determination result OT is in a heat generation normality-state, the overheat-protection limiting device 92 generates a d-axis current command value Id* and a q-axis current command value Iq* as a d-axis current command value Idc and a q-axis current command value Iqc, which are outputted into the voltage command generation device 95.

According to this arrangement, when a heat generation abnormality-state such as abnormality or the like of a cooling device is caused, the operations become an action to limit an electric current flowing through a semiconductor switching element(s) to be reduced, so that it becomes possible to prevent a rapid rise of a temperature of the semiconductor switching element(s) in a heat generation abnormality-state such as abnormality or the like of the cooling device.

In addition, when a heat generation abnormality-state determination result OT is in a heat generation abnormality-state, the configuration is adopted so that a d-axis current command value Id* and a q-axis current command value Iq* are limited to predetermined current command values, whereby the limitation does not work on when the d-axis current command value Id* and the q-axis current command value Iq* are smaller than the predetermined electric current command values. According to this arrangement, even in a situation in which a heat generation abnormality-state is caused, it become possible to perform the operations not to excessively limit an electric current under an electric current condition in which a semiconductor switching element(s) does not become in an overheat state; and thus, it is possible to prevent unnecessarily limit an action of the electrical power conversion apparatus.

Note that, the overheat-protection limiting device 92 limits a d-axis current command value Id* and a q-axis current command value Iq* to predetermined current command values when a heat generation abnormality-state determination result OT is in a heat generation abnormality-state, and then generates the d-axis current command value Idc and the q-axis current command value Iqc; however, a method of limiting the electric current command values is not restricted to the method. For example, it may also be suitable to generate, as a d-axis current command value Idc and a q-axis current command value Iqc, command values in which a d-axis current command value Id* and a q-axis current command value Iq* are multiplied by predetermined ratios which are each smaller than one.

<Effects of Case Applying Embodiment 1>

Here, the explanation will be made referring to FIG. 7A and FIG. 7B for a case in which a heat generation abnormality-state can be detected earlier in comparison with a conventional method, when Embodiment 1 is applied to as described above.

Figure 7A:
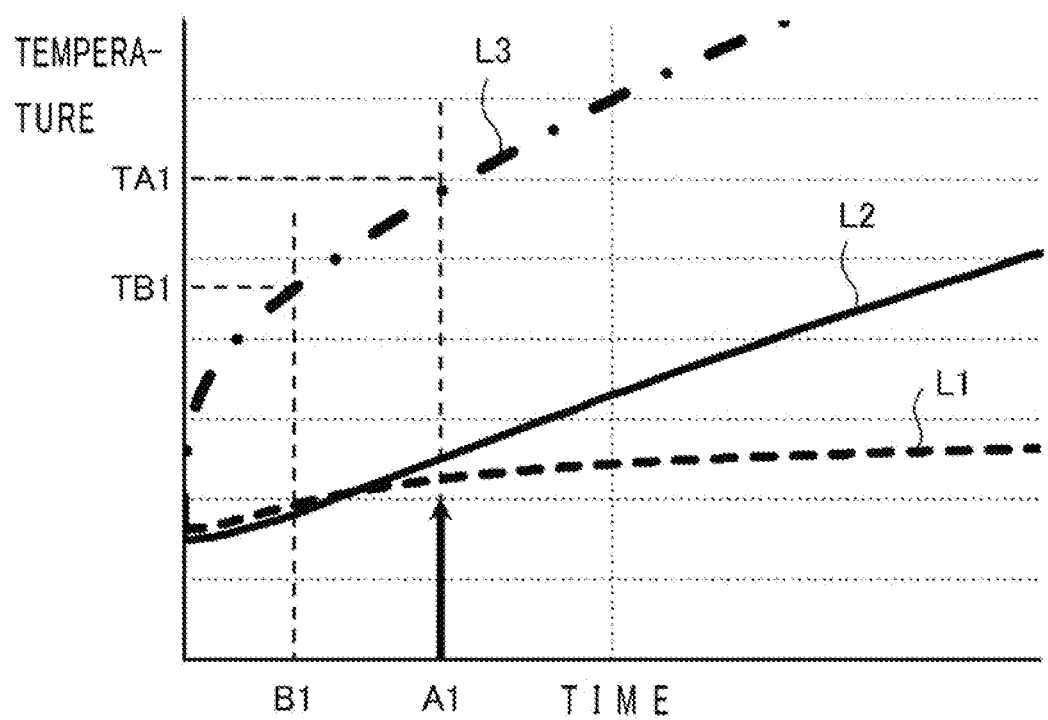
FIG. 7A is a diagram showing effects in the electrical power conversion apparatus according to Embodiment 1.

FIG. 7A is a diagram showing, by way of example, transition of a temperature (junction temperature) of a semiconductor switching element in the electrical power conversion apparatus 100 according to Embodiment 1 and transitions of temperature detection values of a temperature detector.

FIG. 7A is a diagram showing effects in the electrical power conversion apparatus according to Embodiment 1. The vertical axis indicates a temperature, and the horizontal axis, time. FIG. 7B is a diagram showing, by way of example, transitions of temperature-detection change-rates of the temperature detector in the electrical power conversion apparatus 100 according to Embodiment 1. The vertical axis indicates a temperature change-rate, and the horizontal axis, time.

Figure 7B:
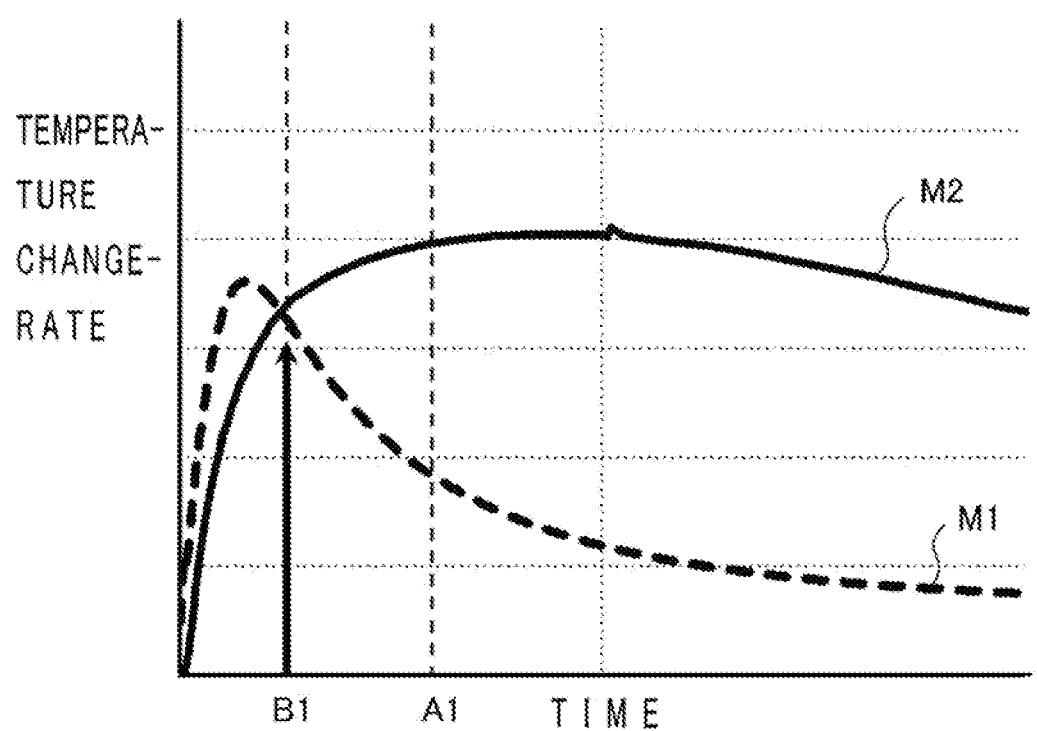
FIG. 7B is a respective diagram showing other effects in the electrical power conversion apparatus according to Embodiment 1.

To be specific, FIG. 7A and FIG. 7B are each diagrams in which transition of a normal heat generation state and that of a heat generation abnormality-state are compared in a case in which inverter circuitry operates at a certain constant output. To be more specific, FIG. 7A and FIG. 7B are each diagrams showing the transitions where the normal heat generation state is defined as a case in which a cooling device is in a normal state, and where the heat generation abnormality-state is defined as a case in which an abnormal state of the cooling device is presumed so that a cooling medium of the cooling device disappeared.

In FIG. 7A, symbol L1 indicates a temperature detection value (normal heat generation state); symbol L2, a temperature detection value (abnormal heat generation state); and symbol L3, a junction temperature (abnormal heat generation state). In addition, in FIG. 7B, symbol M1 indicates a temperature-detection change-rate (normal heat generation state); and symbol M2, a temperature-detection change-rate (abnormal heat generation state).

As shown in FIG. 7A, as for the transitions of temperature detection values, a meaningful difference does not appear between a normal heat generation state and a heat generation abnormality-state in an early period in the transitions of the temperature detection values, whereas a meaningful difference appears between the normal heat generation state and the heat generation abnormality-state in the temperature detection values after timing of A1, so that, after the timing of A1, the temperature detection value in the heat generation abnormality-state becomes meaningfully larger with respect to the temperature detection value in the normal heat generation state. Meanwhile, as shown in FIG. 7B, as for the transition of temperature-detection change-rates, a meaningful difference does not appear between a normal heat generation state and a heat generation abnormality-state in a significantly early period in the temperature-detection change-rates; however, a meaningful difference appears in the temperature-detection change-rates between the normal heat generation state and the heat generation abnormality-state at timing of B1 being distinctly earlier timing, in comparison with the timing of A1 at which a meaningful difference appears between the normal heat generation state and the heat generation abnormality-state in the temperature detection values. After the timing of B1, the temperature-detection change-rate of the heat generation abnormality-state becomes meaningfully larger with respect to the temperature-detection change-rate of the normal heat generation state. As described above, a change in a temperature detection value is time-based integration of temperature-detection change-rates, so that a change in the temperature detection value is verified with a time-delay with respect to the change in the temperature-detection change-rate as the transitions indicate.

Also in FIG. 7A, collectively shown is transition of a temperature (junction temperature) of the switching element in the heat generation abnormality-state. In FIG. 7A, a junction temperature TA1 at the timing of A1 where a heat generation abnormality-state can be determined on the basis of a temperature detection value becomes higher in its temperature in comparison with a junction temperature TB1 at the timing of B1 where the heat generation abnormality-state can be determined on the basis of a temperature-detection change-rate.

As described above, the configuration being a feature of the present invention of the application concerned is adopted in which a heat generation abnormality-state is determined by comparing a temperature-detection change-rate calculation value with a temperature-detection-value change-rate estimation value, whereby a heat generation abnormality-state becomes possible to be detected earlier in comparison with a conventional scheme of comparing a temperature detection value with a temperature detection-value estimation value, so that, even in the heat generation abnormality-state, it becomes possible to perform the protection by limiting an action of a semiconductor switching element(s) before it becomes higher in its temperature.

As explained above, the electrical power conversion apparatus 100 of Embodiment 1 calculates a loss of a semiconductor switching element(s) on the basis of at least an electric current detection value; the electrical power conversion apparatus estimates a change rate of a temperature detection value on the basis of a switching-element loss calculation value of the semiconductor switching element(s); and the electrical power conversion apparatus determines a heat generation abnormality-state by comparing a temperature-detection change-rate calculation value calculated from the temperature detection value with a temperature-detection-value change-rate estimation value. For this reason, in a heat generation abnormality-state such as abnormality or the like of a cooling device, the configuration is adopted to perform the comparison of an estimation value with a detection value in relation to a temperature change rate in which the difference is significantly caused in comparison with a normal heat generation state, whereby it becomes possible to detect a heat generation abnormality-state earlier than a conventional method.

In addition, when a heat generation abnormality-state is determined, an action is limited so that an electric current flowing through a semiconductor switching element(s) is restricted, whereby, even in the heat generation abnormality-state in which a temperature of the semiconductor switching element(s) can be rapidly rise, it is possible to securely perform a protective operation capable of preventing the overheat.

Note that, as described above, the switching elements 51 through 56 of the inverter circuitry 25 may be made by using any of semiconductor elements or devices. For example, the switching elements each may be made by using a wide band-gap semiconductor. As a material for the wide band-gap semiconductor, silicon carbide (SiC), gallium nitride (GaN) and the like can be named.

By configuring switching elements to use these semiconductors, heat resisting property of the switching element can be enhanced, which contributes to increase the performance. On the other hand, the costs for the switching elements 51 through 56 made by using a wide band-gap semiconductor become higher in comparison with those for switching elements made by using conventional silicon (Si). Thus, the inverter circuitry 25 comprising a wide band-gap semiconductor becomes high in costs.

In the electrical power conversion apparatus 100 of Embodiment 1, it becomes possible to lower the maximum achievable temperature of a semiconductor switching element, and thus, the usage of a semiconductor switching element whose heat resisting property is low and/or the usage of a semiconductor switching element whose loss is large are made possible, so that it becomes possible to configure the electrical power conversion apparatus by low-cost semiconductor switching elements. Furthermore, in the electrical power conversion apparatus 100 of Embodiment 1, it is possible to suitably control a temperature rise of a semiconductor switching element(s), and so, the maximum achievable temperature of a semiconductor switching element can be approached near to an operational limitation temperature. For this reason, chip size reduction of a semiconductor switching element which has been hitherto impossible because of introducing lowered heat dissipation capability is also made applicable, so that it becomes possible to further reduce the costs.

Embodiment 2

An electrical power conversion apparatus of Embodiment 2 has the difference in a heat generation abnormality-state determination function device of the control device, and the difference in an overheat-protection limiting device thereof, with respect to the electrical power conversion apparatus 100 of Embodiment 1. In more detail, the electrical power conversion apparatus of Embodiment 2 is an electrical power conversion apparatus in which a temperature detection value is used for temperature-detection change-rate estimation calculation of the heat generation abnormality-state determination function device, and in addition, the temperature detection value is used for the overheat-protection limiting device.

Hereinafter, the explanation will be made, referring to FIG. 8 being a functional block diagram of the control device 90 in the electrical power conversion apparatus 200 and FIG. 9 being a functional block diagram of the heat generation abnormality-state determination function device 91B, for the operations of the electrical power conversion apparatus according to Embodiment 2, while focusing on the differences from those of Embodiment 1.

Figure 8:
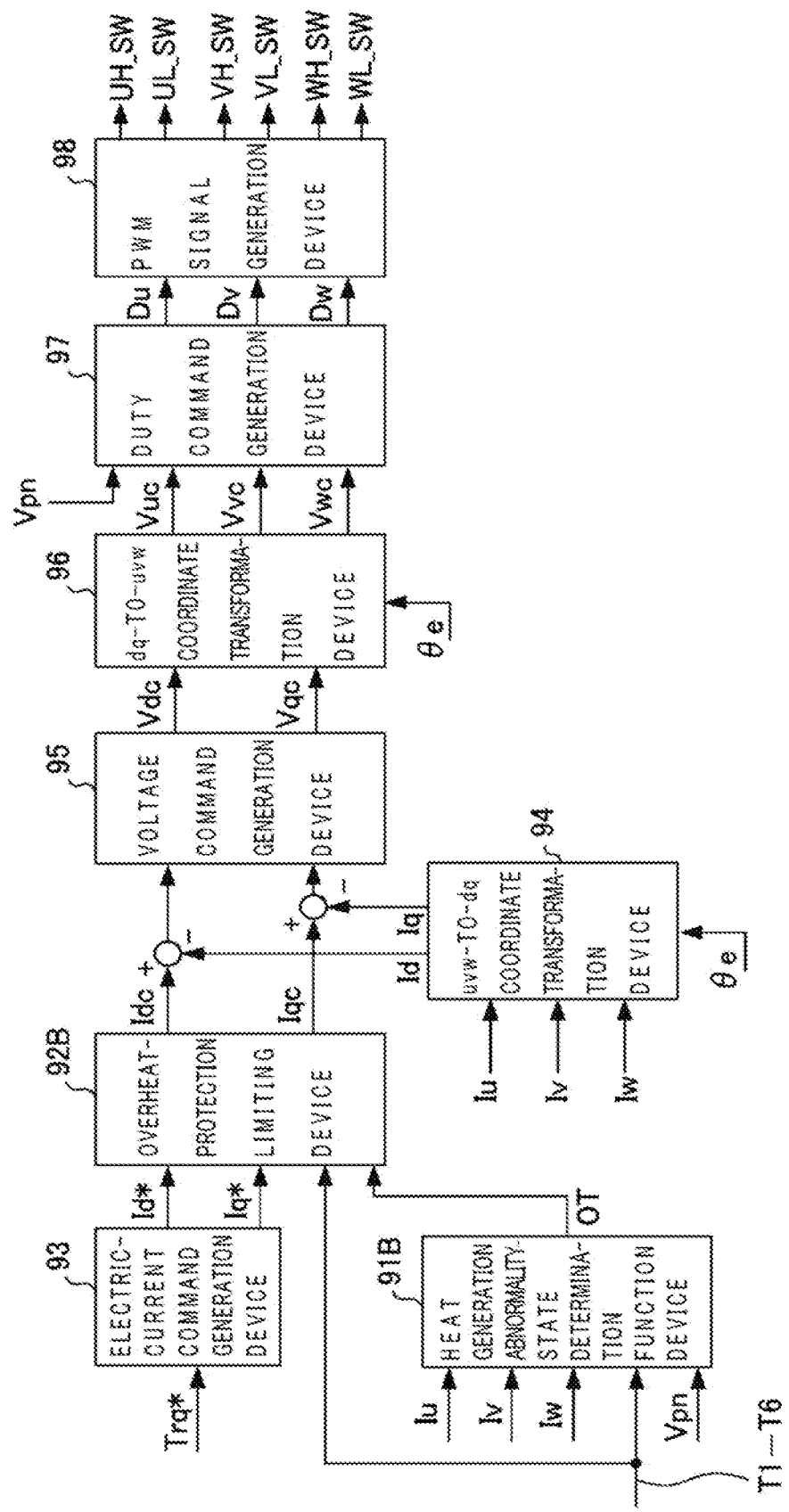
FIG. 8 is a functional block diagram of a control device in an electrical power conversion apparatus according to Embodiment 2.
Figure 9:
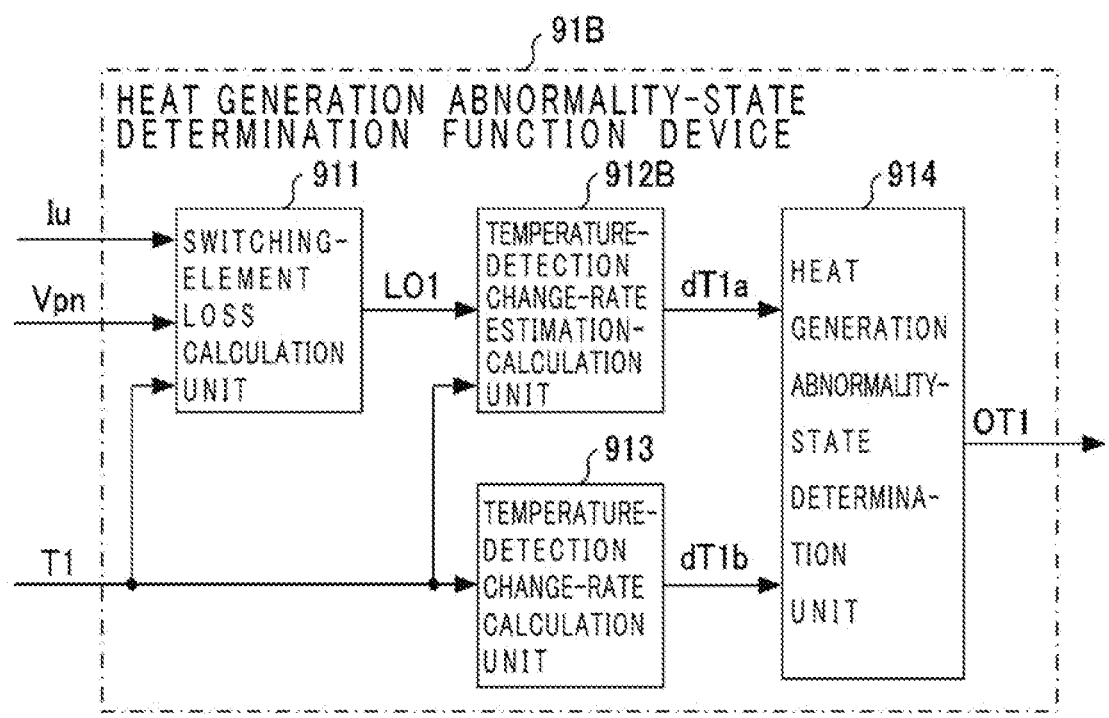
FIG. 9 is a functional block diagram of a heat generation abnormality-state determination function device of the control device in the electrical power conversion apparatus according to Embodiment 2.

In FIG. 8 and FIG. 9 being the block diagrams each showing the configurations of the control device 90 of Embodiment 2, the same reference numerals and symbols designate the same or corresponding constituent items, portions or parts to those of Embodiment 1.

In addition, in order to distinguish from Embodiment 1, the heat generation abnormality-state determination function device 91B and the overheat-protection limiting device 92B are designated.

The electrical power conversion apparatus of Embodiment 2 is constituted of the electric power conversion device 20, the control device 90 and the cooling device 35. Because the electric power conversion device 20 and the cooling device 35 are the same as those of the electrical power conversion apparatus 100 of Embodiment 1, the explanation will be made for the configuration and functions in relation to the control device 90.

<Functional Blocks of Control Device>

FIG. 8 is a diagram showing functional blocks of the control device 90 in the electrical power conversion apparatus 200 according to Embodiment 2. In FIG. 8, the control device 90 comprises the heat generation abnormality-state determination function device 91B, the overheat-protection limiting device 92B, the electric-current command generation device 93, the uvw-to-dq coordinate transformation device 94, the voltage command generation device 95, the dq-to-uvw coordinate transformation device 96, the duty command generation device 97, and the PWM signal generation device 98.

Because the electric-current command generation device 93, the uvw-to-dq coordinate transformation device 94, the voltage command generation device 95, the dq-to-uvw coordinate transformation device 96, the duty transformation device 97 and the PWM signal generation device 98 are the same as those of Embodiment 1, their explanation will be omitted.

The heat generation abnormality-state determination function device 91B includes a function being a feature of the present invention of the application concerned in which a loss of the semiconductor switching element(s) is calculated on the basis of at least an electric current detection value, and a change rate of a temperature detection value is estimated through calculation on the basis of the switching-element loss calculation value and on that of the temperature detection value, and also in which a temperature-detection change-rate is calculated from the temperature detection value, so that a heat generation abnormality-state of the semiconductor switching element(s) is estimated by comparing the temperature-detection change-rate estimation value with the temperature-detection change-rate calculation value. In particular, a different point from Embodiment 1 is a point in which, for the calculation of a temperature-detection change-rate estimation value, its calculation is performed on the basis of the temperature detection value in addition to the switching-element loss calculation value.

Into the heat generation abnormality-state determination function device 91B, electric current detection values Iu, Iv and Iw are inputted from the electric current detection unit 26; temperature detection values T1 through T6 are inputted from the temperature detectors 71 through 76; and a voltage detection value Vpn is inputted from the voltage detection device 24. On the basis of these pieces of information, the heat generation abnormality-state determination function device 91B estimates a heat generation abnormality-state of the semiconductor switching element(s), and performs an output as a heat generation abnormality-state determination result OT into the overheat-protection limiting device 92B. Here, the electric current detection values of the electric current detection unit 26 are constituted of a phase-U current detection value corresponding to a phase-U current Iu detected by the phase-U current detector 261, a phase-V current detection value corresponding to a phase-V current Iv detected by the phase-V current detector 262, and a phase-W current detection value corresponding to a phase-W current Iw detected by the phase-W current detector 263. As for a more detailed configuration of the heat generation abnormality-state determination function device 91B, the explanation will be made later.

The overheat-protection limiting device 92B includes a function being a feature of the present invention of the application concerned in which, on the basis of a determination result of a heat generation abnormality-state and on that of the temperature detection values, an action of a switching element(s) is limited so that its electric current is restricted. In particular, a different point from Embodiment 1 is a point in which an action of a switching element(s) is limited on the basis of the temperature detection values in addition to a determination result of a heat generation abnormality-state.

Into the overheat-protection limiting device 92B, a d-axis current command value Id*, a q-axis current command value Iq* and a heat generation abnormality-state determination result OT are inputted, and temperature detection values T1 through T6 are inputted from the temperature detectors 71 through 76. On the basis of the heat generation abnormality-state determination result OT and on that of the temperature detection values T1 through T6, the overheat-protection limiting device 92B limits the d-axis current command value Id* and the q-axis current command value Iq* to predetermined electric current command values, and then generates a d-axis current command value Idc and a q-axis current command value Iqc, respectively.

Here, a point of a feature of the electrical power conversion apparatus according to Embodiment 2 resides in a point in which: the heat generation abnormality-state determination function device 91B and the overheat-protection limiting device 92B are provided in the control device 90; and, when determination of a heat generation abnormality-state is performed in the heat generation abnormality-state determination function device 91B, a d-axis current command value and a q-axis current command value are limited to predetermined electric current command values in the overheat-protection limiting device 92B.

In addition, a point of the electrical power conversion apparatus according to Embodiment 2 resides in a point in which: the heat generation abnormality-state determination function device 91B calculates a loss of a semiconductor switching element(s) on the basis of at least an electric current detection value; the heat generation abnormality-state determination function device estimates through calculation a change rate of the temperature detection value on the basis of the switching-element loss calculation value and on that of a temperature detection value, and also calculates a temperature-detection change-rate from the temperature detection value; and the heat generation abnormality-state determination function device estimates a heat generation abnormality-state of the semiconductor switching element(s) by comparing the temperature-detection change-rate estimation value with the temperature-detection change-rate calculation value.

Hereinafter, the explanation will be made in detail for the operations of the heat generation abnormality-state determination function device 91B and those of the overheat-protection limiting device 92B which are the features of the electrical power conversion apparatus according to Embodiment 2.

<Functional Blocks of Heat Generation Abnormality-state Determination Function Device>

FIG. 9 is a diagram showing functional blocks of the heat generation abnormality-state determination function device 91B of the control device 90 in the electrical power conversion apparatus 200 according to Embodiment 2. In FIG. 9, the heat generation abnormality-state determination function device 91B is constituted of the switching-element loss calculation unit 911, a temperature-detection change-rate estimation-calculation unit 912B, the temperature-detection change-rate calculation unit 913 and the heat generation abnormality-state determination unit 914.

Because the switching-element loss calculation unit 911, the temperature-detection change-rate calculation unit 913 and the heat generation abnormality-state determination unit 914 are identical to those of Embodiment 1, their explanation is omitted.

Note that, in FIG. 9, heat generation abnormality-state determination functions related to the switching element 51 at phase-U upper arm are representatively shown in the figure, and so, the description of heat generation abnormality-state determination functions related to the other switching elements 52 through 56 will be omitted for brevity of explanation. Also in the following explanation, the heat generation abnormality-state determination functions related to the switching element 51 at phase-U upper arm are representatively described. In relation to the other switching elements 52 through 56, their heat generation abnormality-state determination functions can also be similarly configured.

The temperature-detection change-rate estimation-calculation unit 912B estimates through calculation, by defining as its inputs a semiconductor-switching-element loss calculation value LO1 from the switching-element loss calculation unit 911 and a temperature detection value T1 of the temperature detector 71, a temperature-detection change-rate being a change rate of the temperature detection value T1 of the temperature detector 71 per unit time, and outputs a temperature-detection change-rate estimation value dT1a. (Herein, a change rate of a temperature detection value per unit time is referred to as a "temperature-detection change-rate" for the sake of simplicity of the explanation.)

In more detail, in the temperature-detection change-rate estimation-calculation unit 912B, thermal circuitry of heat transfer paths from the semiconductor switching element 51 into the temperature detector 71 is stored as shown in FIG. 6 in advance; and, on the basis of the thermal circuitry, on that of the loss LO1 of the semiconductor switching element 51 and on that of the temperature detection value, the temperature-detection change-rate estimation-calculation unit calculates a temperature rise quantity $\Delta T1$ of a detection temperature of the temperature detector 71, by defining a temperature of the cooling water 36 as a reference. Note that, as for the calculation of the temperature rise quantity $\Delta T1$ on the basis of the thermal circuitry, on that of the loss LO1 of the semiconductor switching element 51 and on that of the temperature detection value, the calculation is carried out by also using a temperature rise quantity $\Delta T1$old of a detection temperature having been calculated in previous time.

In addition, in the temperature-detection change-rate estimation-calculation unit 912B, temperature characteristics of a detection error of the temperature detector 71 are stored in advance, so that the temperature-detection change-rate estimation-calculation unit 912B calculates, by using the temperature characteristics of a detection error of the temperature detector 71, a detection error Ter of the temperature detector 71 on the basis of a temperature detection value T1 of the temperature detector 71 being inputted. Note that, the temperature characteristics of a detection error of the temperature detector 71 may be stored, for example, as a table of detection errors with respect to detection temperatures, or may also be stored as a functional expression by defining a detection temperature as an argument.

And then, the temperature-detection change-rate estimation-calculation unit 912B calculates a post-error-correction temperature rise quantity ΔT1a in which a detection error Ter of the temperature detector 71 is incorporated with respect to a temperature rise quantity ΔT1 of a detection temperature being calculated, and calculates a change rate of the post-error-correction temperature rise quantity ΔT1a per unit time on the basis of the post-error-correction temperature rise quantity ΔT1a, so that the temperature-detection change-rate estimation-calculation unit 912B outputs a calculation result as a temperature-detection change-rate estimation value dT1a. Note that, as described above, the temperature-detection change-rate estimation value dT1a is calculated by using a temperature rise quantity ΔT1 of a detection temperature of the temperature detector 71 calculated on the basis of thermal circuitry stored in advance and on that of a loss LO1 of the semiconductor switching element 51, and thus, temperature information of the cooling water 36 itself is not necessary for the calculation.

By taking on the configuration described above, it becomes possible to calculate the temperature-detection change-rate estimation value dT1a by including the temperature characteristics of a detection error of the temperature detector 71. According to this arrangement, in the heat generation abnormality-state determination unit 914, the comparison of the temperature-detection change-rate estimation value dT1a with the temperature-detection change-rate calculation value dT1b is enabled in which the temperature characteristics of a detection error of the temperature detector 71 are included for the comparison, so that it becomes possible to more accurately determine a heat generation abnormality-state.

<Operations of Overheat-protection Limiting Device 92B>

The overheat-protection limiting device 92B includes a function in which, on the basis of a determination result of a heat generation abnormality-state and on that of a temperature detection value(s) of a temperature detector(s), an action of a switching element(s) is limited so that its electric current is restricted. Into the overheat-protection limiting device 92B, a d-axis current command value Id* and a q-axis current command value Iq* are inputted from the electric-current command generation device 93, a heat generation abnormality-state determination result OT is inputted from the heat generation abnormality-state determination function device 91B, and temperature detection values T1 through T6 are inputted from the temperature detectors 71 through 76, respectively. Here, the highest temperature from among the temperature detection values T1 through T6 being inputted is defined as a detection-temperature's maximum value Tmax.

The overheat-protection limiting device 92B compares a detection-temperature's maximum value Tmax with a predetermined temperature Tth1 being set in advance, when a heat generation abnormality-state determination result OT is in a heat generation abnormality-state; and, when the detection-temperature's maximum value Tmax is larger than the predetermined temperature Tth1, the overheat-protection limiting device 92B limits a d-axis current command value Id* and a q-axis current command value Iq* to predetermined electric current command values, and generates a d-axis current command value Idc and a q-axis current command value Iqc, which are outputted into the voltage command generation device 95. Meanwhile, when a heat generation abnormality-state determination result OT is in a heat generation abnormality-state and when the detection-temperature's maximum value Tmax is smaller than the predetermined temperature Tth1, the overheat-protection limiting device 92B generates a d-axis current command value Id* and a q-axis current command value Iq* as a d-axis current command value Idc and a q-axis current command value Iqc, which are outputted into the voltage command generation device 95.

In addition, the overheat-protection limiting device 92B compares a detection-temperature's maximum value Tmax with a predetermined temperature Tth2 being set in advance, when a heat generation abnormality-state determination result OT is in a heat generation normality-state; and, when the detection-temperature's maximum value Tmax is larger than the predetermined temperature Tth2, the overheat-protection limiting device 92B limits a d-axis current command value Id* and a q-axis current command value Iq* to predetermined electric current command values, and generates a d-axis current command value Idc and a q-axis current command value Iqc, which are outputted into the voltage command generation device 95. Meanwhile, when a heat generation abnormality-state determination result OT is in a heat generation normality-state and when the detection-temperature's maximum value Tmax is smaller than the predetermined temperature Tth2, the overheat-protection limiting device 92B generates a d-axis current command value Id* and a q-axis current command value Iq* as a d-axis current command value Idc and a q-axis current command value Iqc, which are outputted into the voltage command generation device 95. Note that, it is desirable to set a predetermined temperature Tth2 and a predetermined temperature Tth1 so that the predetermined temperature Tth2 is higher at its temperature than the predetermined temperature Tth1.

According to this arrangement, when a heat generation abnormality-state such as abnormality or the like of a cooling device is caused, the operations become an action to limit an electric current flowing through a semiconductor switching element(s) to be reduced, so that it becomes possible to prevent a rapid rise of a temperature of the semiconductor switching element(s) in a heat generation abnormality-state such as abnormality or the like of the cooling device.

In addition, even when a heat generation abnormality-state determination result OT is in a heat generation abnormality-state, the configuration is adopted so that an electric current command value is limited only when a temperature detection value is larger than a predetermined temperature, whereby, even in a situation in which a heat generation abnormality-state is caused, it become possible to perform the operations not to excessively limit an electric current under a condition in which a semiconductor switching element(s) becomes in an overheat state, but its damage is not be caused; and thus, it is possible to prevent unnecessarily limit an action of the electrical power conversion apparatus.

Moreover, when heat generation abnormality-state determination result OT1 is in a heat generation abnormality-state, the configuration is adopted in which a predetermined temperature 2 being a condition to limit an electric current command value when the heat generation abnormality-state determination result OT1 is in a heat generation normality-state is set higher with respect to a predetermined temperature 1 being a condition to limit an electric current command value, whereby, with respect to a heat generation abnormality-state in which a rise speed of a temperature of a semiconductor switching element(s) is faster and with respect to a heat generation abnormality-state in which a rise speed of a temperature of the semiconductor switching element(s) is relatively slow, it becomes possible to suitably set on a respective condition in which the semiconductor switching element(s) becomes in an overheat state, but its damage is not be caused; and thus, it becomes possible to perform the operations not to excessively limit an electric current, so that it is possible to prevent unnecessarily limit an action of the electrical power conversion apparatus.

As explained above, the electrical power conversion apparatus 200 of Embodiment 2 calculates a loss of a semiconductor switching element(s) on the basis of at least an electric current detection value; the electrical power conversion apparatus estimates a change rate of a temperature detection value on the basis of a switching-element loss calculation value of the semiconductor switching element(s); and the electrical power conversion apparatus determines a heat generation abnormality-state by comparing a temperature-detection change-rate calculation value calculated from the temperature detection value with a temperature-detection-value change-rate estimation value. For this reason, in a heat generation abnormality-state such as abnormality or the like of a cooling device, the configuration is adopted to perform the comparison of an estimation value with a detection value in relation to a temperature change rate in which the difference is significantly caused in comparison with a normal heat generation state, whereby it becomes possible to detect a heat generation abnormality-state earlier than a conventional method.

<Complementary Notes>

Figure 10:
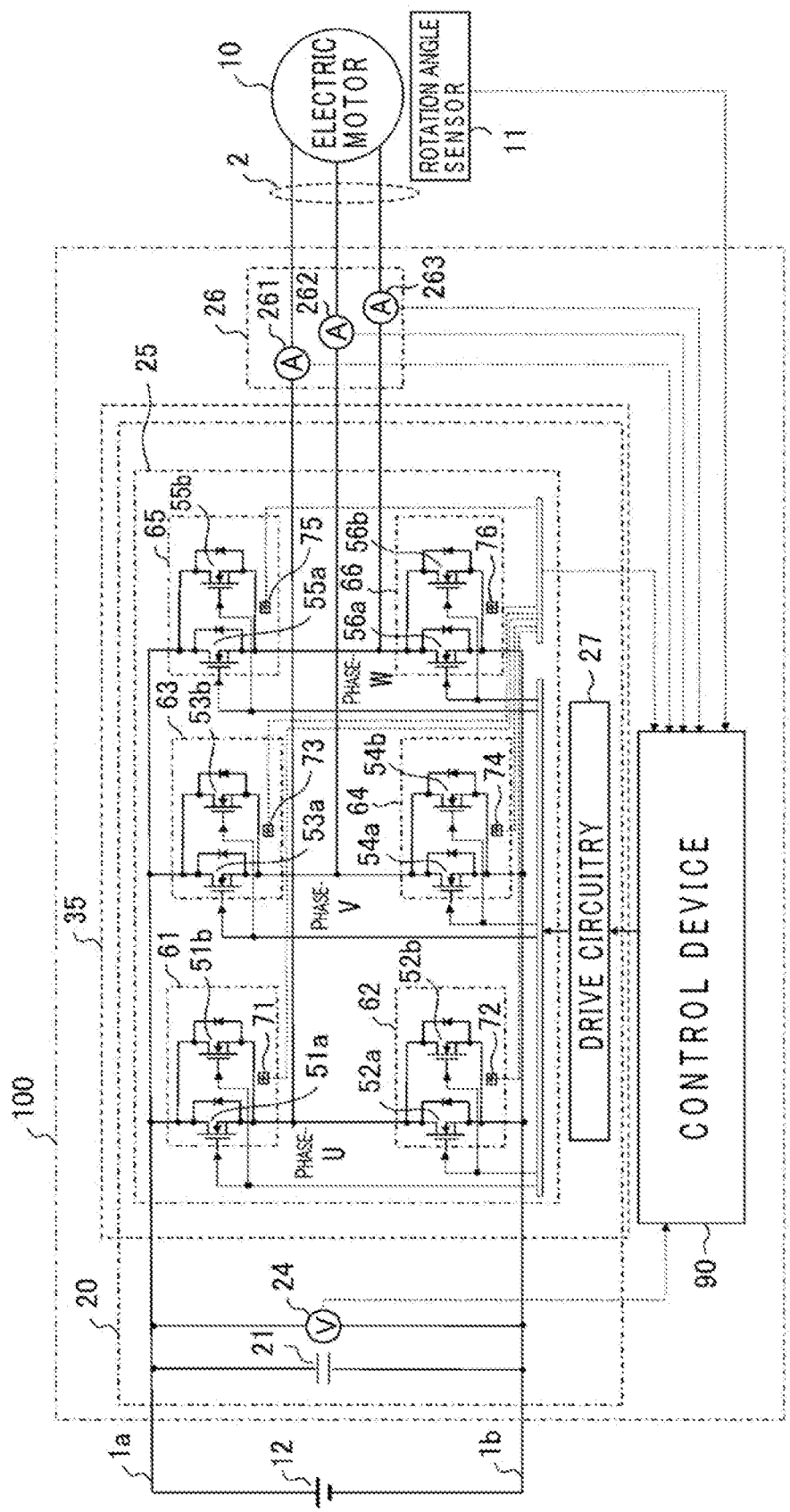
FIG. 10 is a block diagram illustrating a configuration of a modification example of the electrical power conversion apparatus according to Embodiment 1 or that of the electrical power conversion apparatus according to Embodiment 2.

The semiconductor modules 61 through 66 in the electrical power conversion apparatus according to the embodiments each described above are presumed in which each semiconductor module is constituted of one semiconductor switching element and one temperature detector; however, the configuration is not restricted to this. For example, as a modification example illustrated in FIG. 10, each semiconductor module may be constituted of a plurality of semiconductor switching elements and one temperature detector.

In this case, a temperature detector is placed at a predetermined position where the correlation with a temperature of each of the semiconductor switching elements is held.

In this case, in the temperature-detection change-rate estimation-calculation unit 912, thermal circuitry of heat transfer paths from each of the semiconductor switching elements into a respective temperature detector is stored in advance; and, on the basis of the respective thermal circuitry and on that of a loss of each of the semiconductor switching elements, a temperature rise quantity of a detection temperature of the temperature detector 71 is calculated by defining a temperature of the cooling water 36 due to a loss of each of the semiconductor switching elements as a reference, so that it is possible to calculate a temperature rise quantity $\Delta T1$ in accordance with a total sum of respective temperature rise quantities.

According to this arrangement, the protection of a plurality of semiconductor switching elements can be achieved by one temperature detector, and overheat protection can be performed without increasing the number of components, so that it becomes possible to achieve an electrical power conversion apparatus in a more compact size with lower costs.

Figure 11:
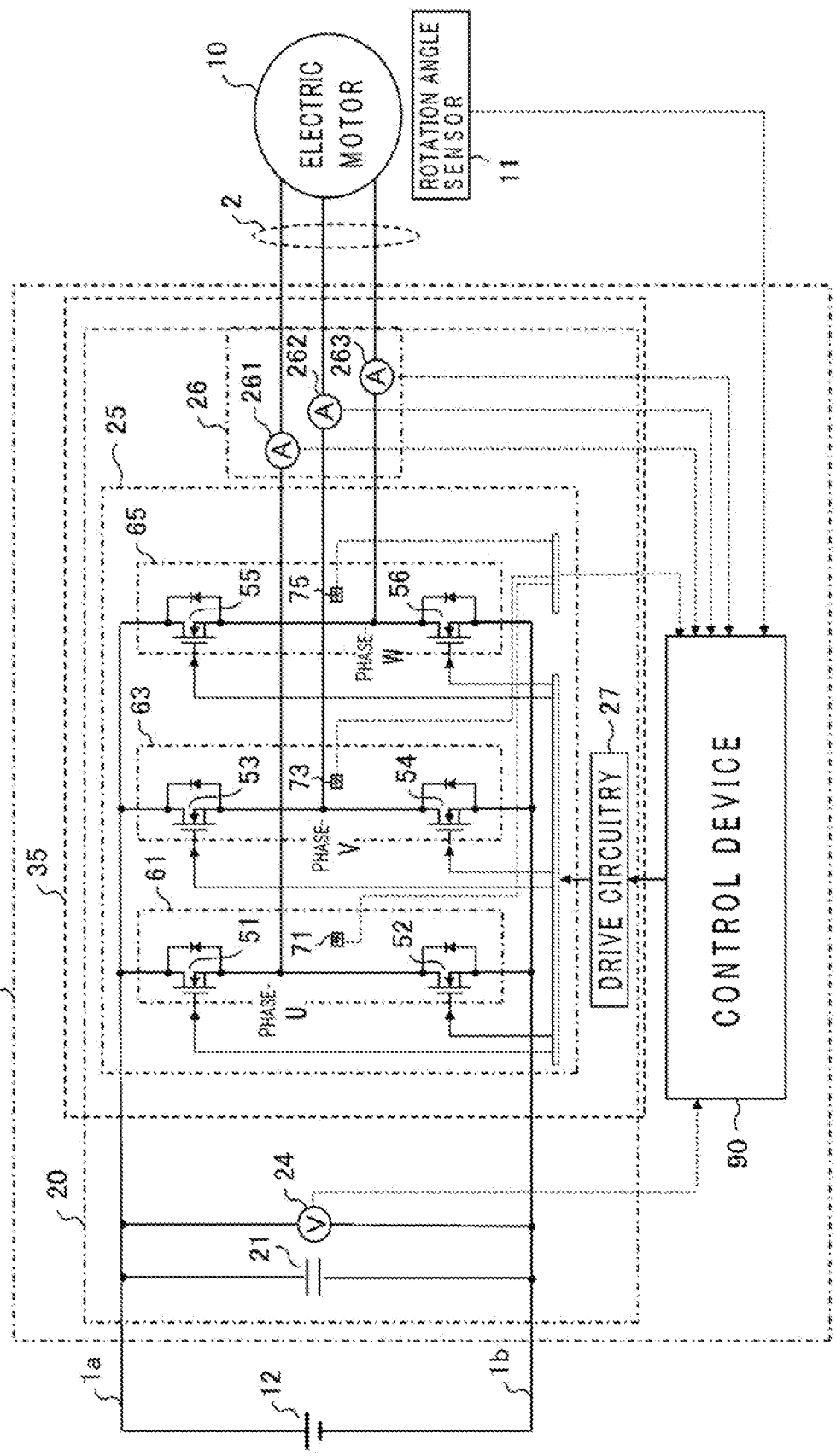
FIG. 11 is a block diagram illustrating a configuration of another modification example of the electrical power conversion apparatus according to Embodiment 1 or that of the electrical power conversion apparatus according to Embodiment 2.

Moreover, the semiconductor modules 61, 63 and 65 are presumed in which each of the semiconductor modules is constituted of a switching element on the upper arm side and one temperature detector, and the semiconductor modules 62, 64 and 66 are presumed in which each of the semiconductor modules is constituted of a switching element on the lower arm side and one temperature detector; however, it is not necessarily restricted to this. For example, as another modification example illustrated in FIG. 11, the configuration may be adopted in such a manner that one semiconductor module is constituted of a switching element on the upper arm side, a switching element on the lower arm side and one temperature detector. In addition, the configuration may be adopted in such a manner that, for example, one semiconductor module is constituted of all of the switching elements of the inverter circuitry 25 and one temperature detector as yet another modification example illustrated in FIG. 12.

Also in these cases, a temperature detector is placed at a predetermined position where the correlation with a temperature of each of semiconductor switching elements is held. Similarly as described above, in the temperature-detection change-rate estimation-calculation unit 912 also, thermal circuitry of heat transfer paths from each of the semiconductor switching elements into a respective temperature detector is stored in advance, and a temperature rise quantity of a detection temperature of the temperature detector 71 is calculated by defining a temperature of the cooling water 36 due to a loss of each of the semiconductor switching elements as a reference, so that it is possible to calculate a temperature rise quantity $\Delta T1$ in accordance with a total sum of respective temperature rise quantities.

According to this arrangement, the protection of a plurality of semiconductor switching elements can be achieved by one temperature detector, and overheat protection can be performed without increasing the number of components, so that it becomes possible to achieve an electrical power conversion apparatus in a more compact size with lower costs.

In the electrical power conversion apparatus according to the embodiments each described above, it has been presumed that the cooling device is a water-cooled cooling device and that the leakage of cooling water occurs as an abnormal state; however, the abnormal state is not restricted to this, but the reduction of the amount of cooling water due to a failure of a cooling device's pump is also included, for example. Also in these cases, because a thermal circuitry changes and presumed cooling performance cannot be obtained, the detection as a heat generation abnormality-state can be performed in accordance with the aforementioned method without causing a problem. In addition, the cooling device is presumed as a water-cooled cooling device; however, the cooling device is not restricted to this, but a cooling fan may also be used for, for example. In that case, abnormality of the cooling fan, clogging of a fan and the like are presumed as abnormal states. Also in those cases, because the thermal circuitry changes and presumed cooling performance cannot be obtained, the detection as a heat generation abnormality-state can be performed in accordance with the aforementioned method without causing a problem.

In addition, a heat generation abnormality-state is not restricted to abnormality of a cooling device. For example, owing to degradation or the like of a semiconductor switching element(s), an abnormal increase of a loss of the semiconductor switching element(s) due to its characteristic deterioration is also included in the heat generation abnormality-state. In this case, because a loss of the semiconductor switching element(s) becomes larger than a loss which is calculated from the characteristics of a known semiconductor switching element, a temperature-detection change-rate calculation value becomes larger than a temperature-detection change-rate estimation value, so that the detection as a heat generation abnormality-state can be performed in accordance with the aforementioned method without causing a problem.

Moreover, in the electrical power conversion apparatus according to the embodiments each described above, the configuration is adopted in which, as a limiting method of an electric current, the electric current command values are limited with respect to a d-axis current command value Id* and to a q-axis current command value Iq*; however, a method of limiting the electric current is not restricted to the method if it is a method to equivalently limit the electric current command values. For example, a method of limiting a command inputted from an upper-level system (not shown in the figures) may also be suitable for. To be more specific, with respect to a torque command value Trq*, it may also be suitable to equivalently lower an electric current command value by limiting a predetermined torque command value, or it may also be suitable to equivalently lower an electric current command value by limiting a command value to a value in which the torque command value Trq* is multiplied by a predetermined ratio which is smaller than one.

Furthermore, as for the electrical power conversion apparatus according to the embodiments described above, it is described by presuming an inverter (Inverter) by which the power conversion takes place from DC power into AC power; however, the kind of electrical power conversion apparatus is not restricted to this, so that it is only necessary that an electrical power conversion apparatus comprises a semiconductor switching element(s), and converts output modes of electric power. For example, an AC/DC converter (Alternate Current/Direct Current Converter) by which the power conversion takes place from AC power into DC power, and/or a DC/DC converter (Direct Current/Direct Current Converter) by which a level of voltage in DC power and that of an electric current therein are changed and outputted may also be suitable for.

In the present disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in the disclosure of the application concerned. For example, there arise cases which are included as a case in which at least one constituent element is modified, added or eliminated, and further a case in which at least one constituent element is extracted and then combined with a constituent element(s) of another embodiment.

What is claimed is:

1. An electrical power conversion apparatus, comprising:
a semiconductor switching element for converting electric power through switching operations thereof;
a cooling device for cooling said semiconductor switching element;
a control device for controlling said semiconductor switching element;
a temperature detector for detecting a temperature of said semiconductor switching element; and
an electric current detector for detecting an electric current flowing through said semiconductor switching element, wherein
the control device comprises:
a semiconductor-switching-element loss calculator for calculating a loss of said semiconductor switching element on a basis of an electric current detection value obtained by the electric current detector;
a temperature-detection change-rate estimation-calculation device for estimating a change rate of a temperature detection value obtained by the temperature detector, on a basis of a switching-element loss calculation value of the semiconductor-switching-element loss calculator;
a temperature-detection change-rate calculation device for calculating a temperature-detection change-rate from a temperature detection value obtained by the temperature detector; and
a heat generation abnormality-state determination device for estimating a heat generation abnormality-state of said semiconductor switching element by comparing a temperature-detection change-rate estimation value obtained by the temperature-detection change-rate estimation-calculation device with a temperature-detection change-rate calculation value obtained by the temperature-detection change-rate calculation device.

2. The electrical power conversion apparatus as set forth in claim 1, wherein
the temperature-detection change-rate estimation-calculation device is a estimation and calculation device which estimates a temperature-detection change-rate being a change rate of a temperature detection value obtained by the temperature detector at a time in a heat generation normality-state; and
the heat generation abnormality-state determination device determines a heat generation abnormality-state when the temperature-detection change-rate calculation value is larger than the temperature-detection change-rate estimation value.

3. The electrical power conversion apparatus as set forth in claim 2, wherein
the heat generation abnormality-state determination device sets at the temperature-detection change-rate estimation value a predetermined lower limitation value of zero or more.

4. The electrical power conversion apparatus as set forth in claim 1, further comprising:
a voltage detector for detecting a voltage applied to said semiconductor switching element, wherein
the semiconductor-switching-element loss calculator calculates a loss of said semiconductor switching element on a basis of an electric current detection value obtained by the electric current detector and on that of a voltage detection value obtained by the voltage detector.

5. The electrical power conversion apparatus as set forth in claim 1, wherein the semiconductor-switching-element loss calculator calculates a loss of said semiconductor switching element on a basis of an electric current detection value obtained by the electric current detector and on that of a switching frequency of said semiconductor switching element.

6. The electrical power conversion apparatus as set forth in claim 1, wherein the semiconductor-switching-element loss calculator calculates a loss of said semiconductor switching element on a basis of at least an electric current detection value obtained by the electric current detector and on that of a temperature detection value obtained by the temperature detector.

7. The electrical power conversion apparatus as set forth in claim 1, wherein
the electrical power conversion apparatus is an electrical power conversion apparatus comprising a plurality of sets of series-connected circuits in each set of which high-potential-side semiconductor switching elements and low-potential-side semiconductor switching elements are connected in series to each other; and
the control device is a control device for alternately turning on the high-potential-side semiconductor switching elements and the low-potential-side semiconductor switching elements for each set of the series-connected circuits while sandwiching dead time therebetween, and wherein
the semiconductor-switching-element loss calculator calculates a loss of said semiconductor switching element on a basis of at least an electric current detection value obtained by the electric current detector and on that of at least the dead time of switching.

8. The electrical power conversion apparatus as set forth in claim 1, wherein the temperature-detection change-rate estimation-calculation device, storing in advance thermal circuitry of heat transfer paths from said semiconductor switching element into the temperature detector, calculates a temperature change-quantity estimation value of the temperature detector in accordance with a switching-element loss calculation value obtained by the semiconductor-switching-element loss calculator and through the thermal circuitry, and calculates a temperature-detection change-rate estimation value from a temperature change-quantity estimation value being calculated.

9. The electrical power conversion apparatus as set forth in claim 1, wherein the temperature-detection change-rate estimation-calculation device, storing in advance thermal circuitry of heat transfer paths from said semiconductor switching element into the temperature detector, calculates a temperature change-quantity estimation value of the temperature detector in accordance with a switching-element loss calculation value obtained by the semiconductor-switching-element loss calculator and through the thermal circuitry, and calculates a temperature-detection change-rate estimation value from a temperature change-quantity estimation value being calculated and from a temperature detection value being obtained by the temperature detector.

10. The electrical power conversion apparatus as set forth in claim 1, wherein the control device comprises an overheat-protection limiting device for limiting an action of a semiconductor switching element on a basis of at least a determination result of a heat generation abnormality-state in said semiconductor switching element.

11. The electrical power conversion apparatus as set forth in claim 10, wherein the overheat-protection limiting device limits an action of a semiconductor switching element so that an electric current flowing through said semiconductor switching element is restricted, when a heat generation abnormality-state is determined.

12. The electrical power conversion apparatus as set forth in claim 10, wherein the overheat-protection limiting device limits an action of a semiconductor switching element so that an electric current flowing through said semiconductor switching element is restricted, when a heat generation abnormality-state is determined and also when a temperature detection value obtained by the temperature detector is higher than a first predetermined temperature TA.

13. The electrical power conversion apparatus as set forth in claim 10, wherein the overheat-protection limiting device limits an action of a semiconductor switching element so that an electric current flowing through said semiconductor switching element is restricted, when a heat generation abnormality-state is determined and also when an electric current flowing through said semiconductor switching element is larger than a predetermined electric current.

14. The electrical power conversion apparatus as set forth in claim 12, wherein the overheat-protection limiting device limits an action of a semiconductor switching element so that an electric current flowing through said semiconductor switching element is restricted, when the temperature detection value is higher than a second predetermined temperature TB.

15. The electrical power conversion apparatus as set forth in claim 14, wherein the second predetermined temperature TB being set in the overheat-protection limiting device is higher than the first predetermined temperature TA.

16. The electrical power conversion apparatus as set forth in claim 1, wherein a heat generation abnormality-state of said semiconductor switching element includes an abnormal state of the cooling device whose cooling performance is lowered.

17. The electrical power conversion apparatus as set forth in claim 1, wherein the cooling device includes a cooling device of a water-cooled scheme.

18. The electrical power conversion apparatus as set forth in claim 1, wherein the cooling device includes a cooling device of a air-cooled scheme.

19. The electrical power conversion apparatus as set forth in claim 1, wherein a heat generation abnormality-state of said semiconductor switching element includes a heat generation abnormality-state in which heat generation of said semiconductor switching element becomes to an extent excessively large.

20. The electrical power conversion apparatus as set forth in claim 1, wherein said semiconductor switching element is constituted of a plurality of semiconductor switching elements connected in parallel with each other, and the temperature detector detects a temperature of the plurality of semiconductor switching elements.

21. The electrical power conversion apparatus as set forth in claim 1, wherein said semiconductor switching element is made of a wide band-gap semiconductor.

* * * * *